(12) United States Patent
Stokes

(10) Patent No.: US 8,458,175 B2
(45) Date of Patent: *Jun. 4, 2013

(54) MULTI-EPOCH METHOD FOR SAVING AND EXPORTING FILE SYSTEM EVENTS

(75) Inventor: Randall K. Stokes, Provo, UT (US)

(73) Assignee: EMC Corporation, Hopkinton, MA (US)

( * ) Notice: Subject to any disclaimer, the term of this patent is extended or adjusted under 35 U.S.C. 154(b) by 15 days.

This patent is subject to a terminal disclaimer.

(21) Appl. No.: 13/163,450

(22) Filed: Jun. 17, 2011

(65) Prior Publication Data

US 2011/0252434 A1    Oct. 13, 2011

Related U.S. Application Data

(63) Continuation of application No. 12/633,717, filed on Dec. 8, 2009, which is a continuation of application No. 10/283,960, filed on Oct. 29, 2002, now Pat. No. 7,653,645.

(51) Int. Cl.
*G06F 17/30* (2006.01)
(52) U.S. Cl.
USPC ............................................. 707/725
(58) Field of Classification Search
USPC ................................. 707/793, 812
See application file for complete search history.

(56) References Cited

U.S. PATENT DOCUMENTS

| | | | | |
|---|---|---|---|---|
| 5,128,878 A | * | 7/1992 | Gore et al. | 345/502 |
| 5,434,994 A | * | 7/1995 | Shaheen et al. | 709/223 |
| 5,592,664 A | * | 1/1997 | Starkey | 1/1 |
| 5,600,834 A | * | 2/1997 | Howard | 713/178 |
| 5,634,008 A | * | 5/1997 | Gaffaney et al. | 709/224 |
| 5,678,042 A | * | 10/1997 | Pisello et al. | 714/47.3 |
| 5,778,395 A | * | 7/1998 | Whiting et al. | 1/1 |
| 5,963,962 A | * | 10/1999 | Hitz et al. | 1/1 |
| 6,003,084 A | * | 12/1999 | Green et al. | 709/227 |
| 6,138,121 A | * | 10/2000 | Costa et al. | 1/1 |
| 6,185,613 B1 | | 2/2001 | Lawson et al. | |
| 6,269,382 B1 | * | 7/2001 | Cabrera et al. | 1/1 |
| 6,549,916 B1 | * | 4/2003 | Sedlar | 1/1 |
| 6,934,766 B1 | * | 8/2005 | Russell | 709/246 |
| 7,062,532 B1 | | 6/2006 | Sweat et al. | |
| 7,213,040 B1 | | 5/2007 | Stokes et al. | |
| 7,496,723 B1 | | 2/2009 | Hanavan, III | |
| 2002/0013854 A1 | | 1/2002 | Eggleston et al. | |
| 2003/0014516 A1 | | 1/2003 | Blackmore et al. | |
| 2003/0176931 A1 | | 9/2003 | Pednault et al. | |
| 2004/0068572 A1 | | 4/2004 | Wu | |
| 2007/0185931 A1 | | 8/2007 | Stokes et al. | |

OTHER PUBLICATIONS

Aiken, Peter, "Microsoft Computer Dictionary"; Microsoft Press, Fifth Edition; 2002; p. 362.
Borland et al., "User's Guide for SDDS Toolkey Version 1.20", Advanced Photon Source, Feb. 1, 2012, pp. 1-165.

(Continued)

*Primary Examiner* — Baoquoc N To
(74) *Attorney, Agent, or Firm* — Barry N. Young

(57) ABSTRACT

As things happen on a volume, the file system forwards events to an event list manager. The event list manager stores the events and associates them with epochs that were active at the time the event occurred. Event consumers can independently declare epochs at any time. When event consumers end an epoch, they can request events that occurred during the epoch, which are reported to the event consumer using the event list manager.

39 Claims, 22 Drawing Sheets

OTHER PUBLICATIONS

HMUG, "man: locate"; http://www.hmug.org/man/1/locate.html (2005).

Levine et al., "NIST Computer Time Services: Internet Time Service (ITS), Automated Computer Time Service (ACTS), and Time.Gov Web Sites"; National Institute of Standard and Technology, May 2002, pp. 1-79.

Pickett, "The American College Dictionary"; Houghton Miffin, Fourth Ed.; 2002; p. 472.

Sinha et al., "WTCP: A Reliable Transport Protocol for Wireless Wide-Area Network", Wireless Networks, vol. 8, Issue 2/3, Mar.-May 2002, pp. 301-316.

* cited by examiner

MULTI-EPOCH METHOD FOR SAVING AND EXPORTING FILE SYSTEM EVENTS

RELATED APPLICATION DATA

This application is a continuation of U.S. patent application Ser. No. 12/633,717, filed Dec. 8, 2009, now allowed, which is a continuation of U.S. patent application Ser. No. 10/283,960, filed Oct. 29, 2002, now U.S. Pat. No. 7,653,645, issued Jan. 26, 2010, both of which are hereby incorporated by reference. This application is related to U.S. patent application Ser. No. 10/283,611, filed Oct. 29, 2002, now U.S. Pat. No. 7,213,040, issued May 1, 2007, which is hereby incorporated by reference.

FIELD OF THE INVENTION

This invention pertains to events, and more particularly to allowing consumers to independently receive sequences of events.

BACKGROUND OF THE INVENTION

There are times when a user (be it a person or a process on a computer) is interested in knowing what is happening on a computer system. Obviously, the user could sit and watch the computer system over time, observing changes as they happen. But this is not a practical solution: the user would need to dedicate at least some of his attention to the computer system, and the computer system would have to grant the user fairly unfettered access to the computer system to check for events.

Rather than having the user directly observe the computer system, an alternative approach is to program the computer system to inform the user of events occurring on the system. This approach is better, in that it allows the user to do something other than direct his attention to the computer system. Once an event occurs, the computer system notifies the user of the event.

But there are some problems with this approach. First, the computer system informs the user of events one at a time. Although sometimes a user is interested in only individual events, more often the user is interested in looking at a number of events occurring over a period of time. Second, the interfaces to such systems are usually proprietary. That is, to request that a user be notified of events, the user must use special tools, both to make the request and to receive the events.

As an example of the first problem, consider a backup tool archiving the computer system. The backup tool is not interested in receiving individual events indicating changes to files on the computer system: the backup tool only wants to know what files have changed after the time the backup tool performs the archive. If the backup tool only receives individual events, the backup tool must then track the events until it is time to perform the archive.

A need remains for a way to provide a user with means to access events in a sequence preferably using a non-proprietary interface that addresses these and other problems associated with the prior art.

SUMMARY OF THE INVENTION

The invention is a method and apparatus for handling event distribution to consumers. Consumers can define epochs as they desire. As events occur, the system logs the events and associates them with active epochs. When consumers are ready to receive events, they close the epochs they opened and request the events. The system then sends the events associated with the closed epochs one at a time. After processing, the events can be removed (or at least disassociated from the epochs). All interactions between the consumers and the system occur using non-proprietary application program interfaces.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
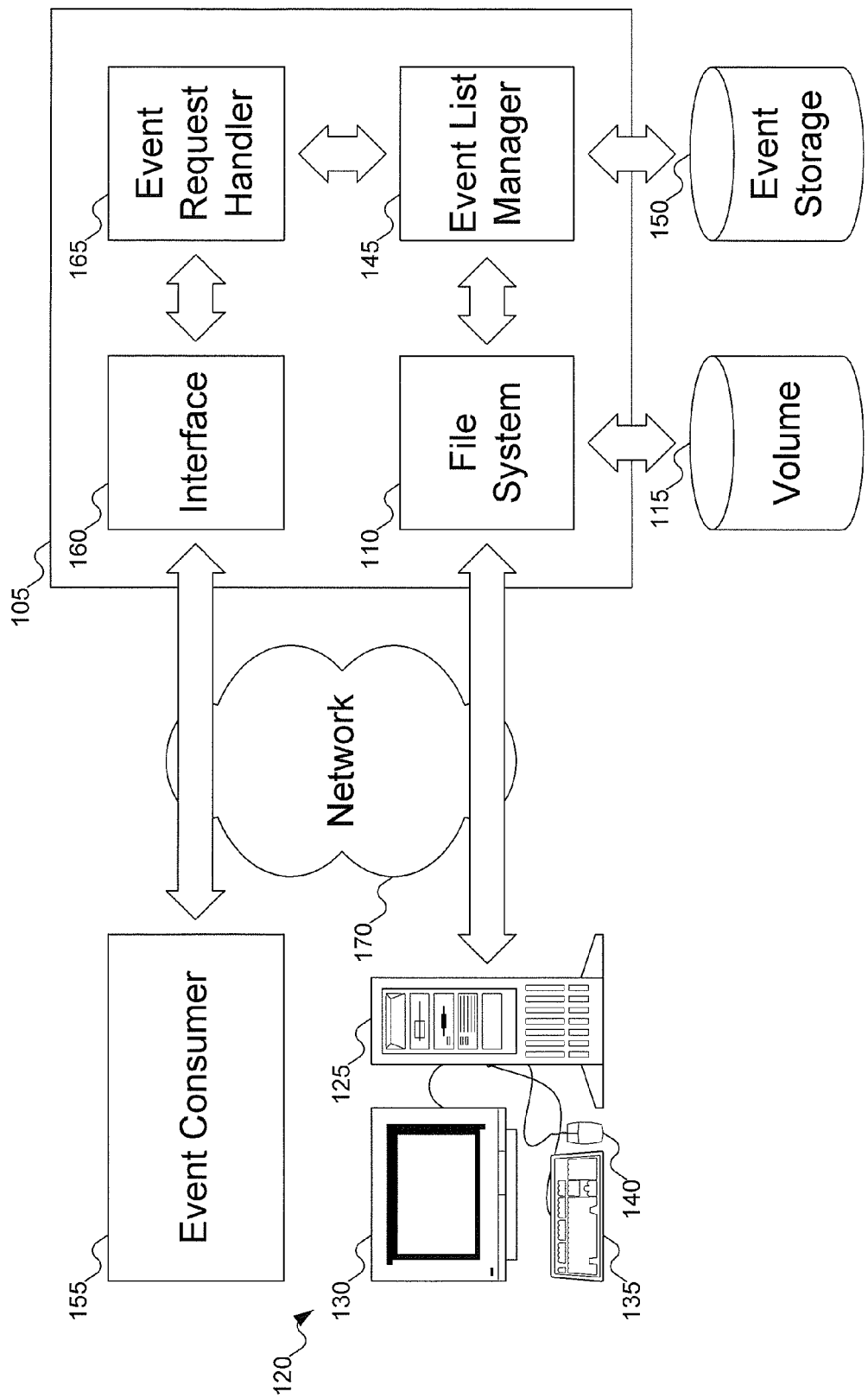
FIG. 1 shows a computer configured to manage events for consumers, according to an embodiment of the invention.

FIG. 1 shows a computer configured to manage events for consumers, according to an embodiment of the invention. In FIG. 1, computer 105 acts as a server, allowing others to access data. But a person skilled in the art will recognize that computer 105 does not have to be limited to a server, and can be any variety of device capable of allowing others to access data.

Computer 105 includes file system 110, which manages the storage of data on volume 115. Volume 115 can be physically within the box that is computer 105, or volume 115 can be remote from computer 105, as required. Volume 115 can also span multiple physical storage devices, if needed (for example, a storage area network (SAN)).

In the server embodiment, computer 105 interacts with clients such as client 120. Client 120 is shown as a desktop computer system, including computer 125, monitor 130, keyboard 135, and mouse 140, but a person skilled in the art will recognize that client 120 can take other forms. For example, client 120 can be, among others, a dumb terminal, an Internet appliance, or a handheld computing device, with the accordant variations in configuration. FIG. 1 does not show additional components that can be part of client 120, such as a printer or other input/output devices, nor does FIG. 1 show the typical components that comprise client 120, such as the central processing unit, memory, local storage, etc.

As client 120 interacts with data stored in volume 115 of computer 105, the interactions generate events. For example, when client 120 saves a file to volume 115, the act of saving the file triggers an event. Other common types of events include modifications to either the data or metadata of files, deletions of files, and renamings of files (a special type of modification to metadata). File system 110 forwards these events to event list manager 145, which stores the events in event storage 150. Event list manager 145 is responsible for storing events as they are generated by file system 110, for associating events with active epochs, for retrieving events as requested by event consumers (a user, computer, or computer process interested in receiving events from computer 105), and for eventually deleting events once they are no longer needed.

Although client 120 can be an event consumer, there is no requirement that the client that generates an event be a consumer of the event. Thus, other consumers, such as event consumer 155, can be notified about events occurring in computer 105. As with client 120, event consumer 155 can take any form of machine, and is not limited to any particular embodiment of a computer. Event consumer 155 uses interface 160 to interface with events in computer 105. In a first preferred embodiment, event consumer 155 uses file system read and write commands (typically in eXtensible Markup Language (XML)) to communicate with interface 160 about events. In a second preferred embodiment, interface 160 processes a Simple Object Access Protocol (SOAP) XML stream from event consumer 155 to interface with events. In either case, interface 160 is responsible for translating messages between event consumer 155 and event request handler 165 (described further below). In both of the preferred embodiments, the commands used to interact with events are standard application program interfaces (APIs) and are, as such, are non-proprietary.

Event request handler 165 processes five types of messages from event consumer 155: declare the start and/or end of an epoch, ping event request handler 165, request one or more events (and receive them, if available) from event list manager 145, remove an event from event list manager 145, and terminate an epoch. Each of these actions is described below in turn.

When event consumer 155 declares the start or end of an epoch, event consumer 155 is indicating the start or end (respectively) of an interval of interest. To declare the start of an epoch, event consumer 155 sends a request to interface 160, which translates the request appropriately to event request handler 165. Event request handler 165 parses the message and signals event list manager 145 to begin a new epoch. Event list manager 145 returns an epoch number to event request handler 165, which forwards the epoch number to interface 160 for translation and transmission to event consumer 155. The epoch number can be combined with an identification number (which can use a Globally Unique IDentifier (GUID)) to help guard against accidental misidentification of epochs by event consumers. Event list manager 145 stores internally the epoch number and tracks the epoch as active (that is, events occurring after the current point in time are considered to be occurring during the epoch). Declaring the end of an epoch is a similar procedure, except that event consumer 155 includes in the message the number of the epoch being ended. Once an epoch is ended, its state is changed to in-use, which means that events are being read from the epoch.

In assigning an epoch number to the epoch declared by event consumer 155, event list manager 145 assigns a unique epoch number to the new epoch. By assigning unique epoch numbers, each event consumer is given the impression that they are the sole consumer of events in computer 105. That is, event consumer 155 receives and processes events from computer 105 without regard or concern for the events that might be processed by another event consumer. This allows many event consumers to work in parallel asynchronously.

Event consumer 155 can send a ping message to event request handler 165. By sending a ping message, event consumer 155 lets event request handler 165 know that event consumer 155 is still alive and in communication with event request handler 165. As described further below with reference to FIGS. 9A-9C, the system can be configured to end epochs that are left open for too long without a communication from the event consumer. Ping messages alert event request handler 165 that the epoch should not be ended as though event consumer 155 forgot to end the epoch or lost contact with event request handler 165. Effectively, ping messages enable event consumer 155 to keep an epoch open for an extended period of time.

Once an epoch has been ended, event consumer 155 can request an event from the epoch through interface 160. Event request handler 165 passes the request to event list manager 145, which checks event storage 150 to determine if there are any events in event storage 150 that occurred during the epoch. If there is an event in event storage 150, then event list manager 145 retrieves the event and returns it to event request handler 165, which delivers the event (through interface 160) to event consumer 155. If there is no event associated with the epoch in event storage 150, then event list manager returns a message that there are no events, which event request handler 165 and interface 160 return to event consumer 155.

Event consumer 155 can also request more than one event from the epoch through interface 160. In that case, after event request handler 165 forwards the request to event list manager 145, event list manager 145 retrieves as many events as will fit into a message. In this manner, event list manager 145 can return more than one event at a time to event consumer 155.

Once event consumer 155 has processed an event, event consumer 155 can send a message to remove the event from event storage 150. When event list manager 145 receives the event (through interface 160 and event request handler 165), event list manager 145 disassociates the event from the epoch. If it turns out that the event is no longer associated with any other epochs, then event list manager 145 can remove the event from event storage 150.

Once event consumer 155 has consumed all the events in the epoch (or at least all the events of interest to event consumer 155), event consumer 155 can send a message indicating that the epoch can be terminated. Typically, this request is made after event consumer 155 has processed all the events associated with the epoch in event storage 150, but the termination message can be sent before then if desired. Terminating the epoch involves disassociating any events still associated with the epoch (and removing any events that are not associated with any epochs) and changing the state of the epoch from in-use to not-in-use.

Typically, client 120 and event consumer 155 interact with computer 105 across a network, such as network 170. Network 170 can be any variety of network including, among others, a local area network (LAN), a wide area network (WAN), a global network (such as the Internet), and a wireless network (for example, using Bluetooth or any of the IEEE 802.11 standards). But a person skilled in the art will also recognize that client 120 and/or event consumer 155 can have a direct connection to computer 105, without crossing a network.

Figure 2:
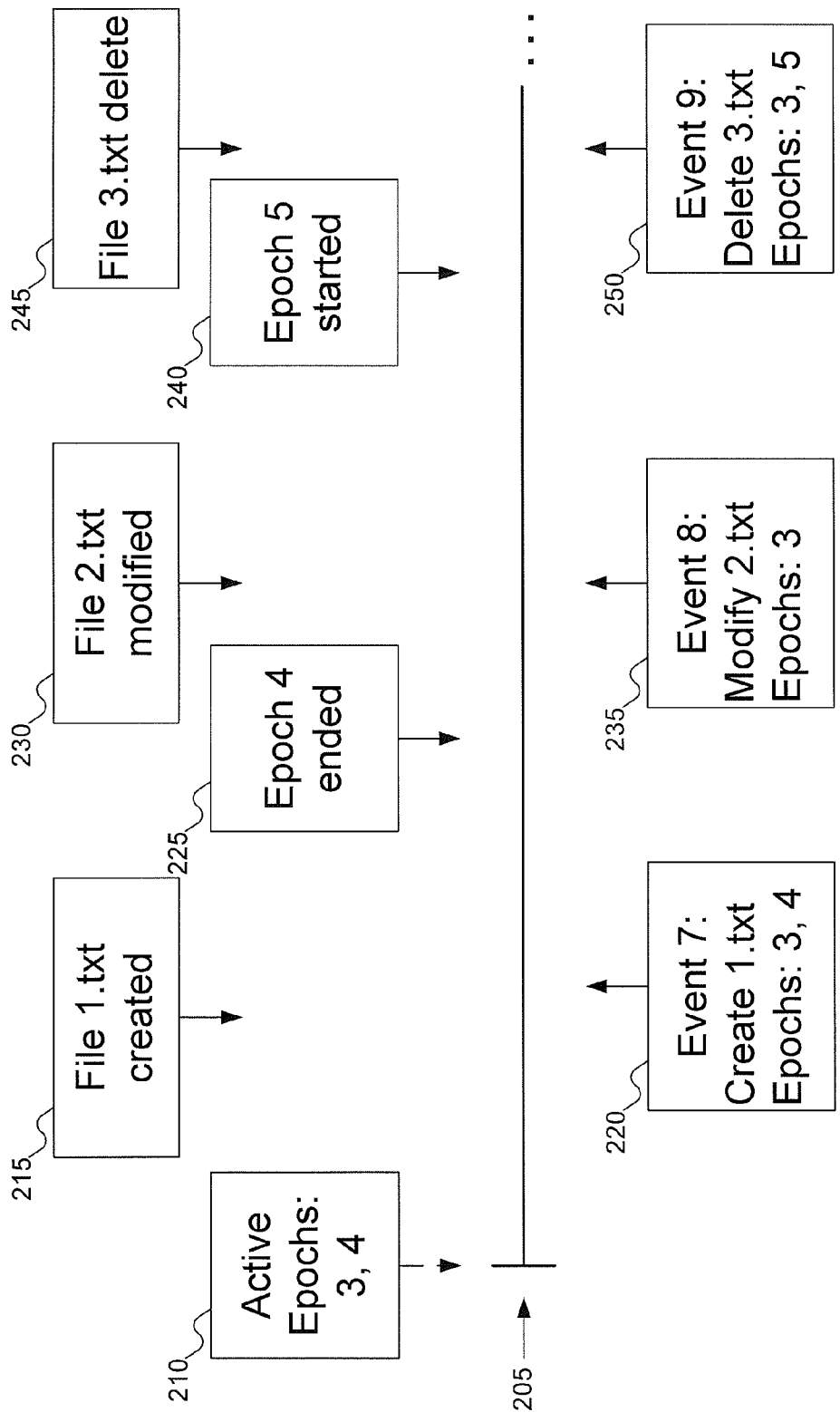
FIG. 2 shows a timeline of events and epoch beginnings and endings occurring in the computer of FIG. 1, according to an embodiment of the invention.

FIG. 2 shows a timeline of events and epoch beginnings and endings occurring in the computer of FIG. 1, according to an embodiment of the invention. In FIG. 2, timeline 205 represents time on computer 105 of FIG. 1, with earlier time toward the left of timeline 205 and later time toward the right of timeline 205. At some point, as shown by box 210, epochs 3 and 4 are started (most likely, not at the same time: box 210 simply shows epochs 3 and 4 as being active wherever timeline 205 begins in FIG. 2). As shown in box 215, a file (file 1.txt) is created. This creates event 220, which stores what happened (creation of file 1.txt) and the epochs that were active at the time the event occurred (3 and 4). Eventually, at box 225, epoch 4 is ended. Later, at box 230, file 2.txt is modified. Event 235 stores the event (modification of file 2.txt) and which epochs were active (3). Later, at box 240, epoch 5 is started. When file 3.txt is deleted in box 245, event 250 stores the event (deletion of file 3.txt) and the active epochs (3 and 5).

Figure 3:
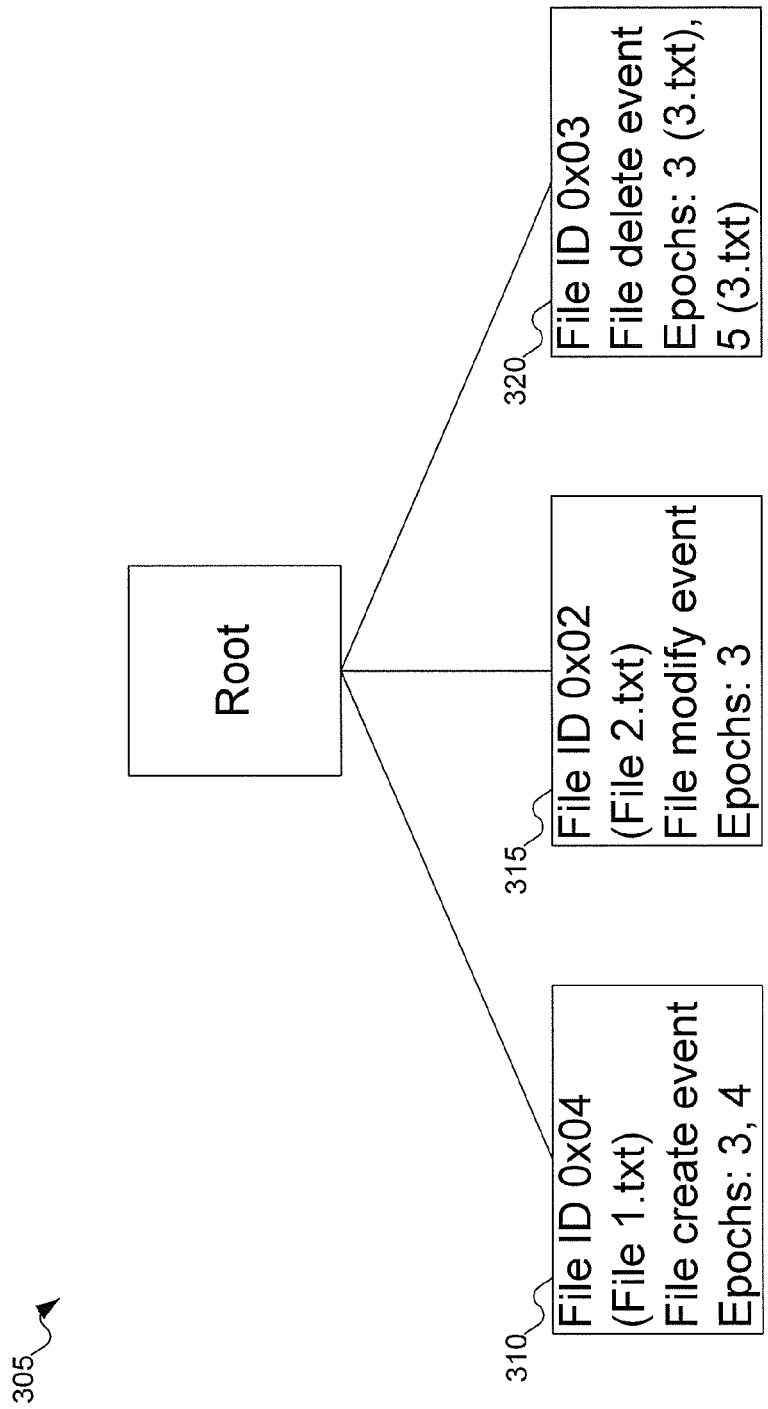
FIG. 3 shows events occurring in the computer of FIG. 1 stored in a b-tree, according to an embodiment of the invention.

FIG. 3 shows events occurring in the computer of FIG. 1 stored in a b-tree, according to an embodiment of the invention. The use of b-trees to store events is preferred, although a person skilled in the art will recognize that other data structures can be used to store events. A b-tree is a data structure designed to minimize the number of nodes that are traversed in searching for a particular node in the tree. B-trees are known in the art and will not be described here. FIG. 3 shows a b-tree with only three nodes and a height of one, but a person skilled in the art will recognize that b-trees can have any number of nodes and can have any depth desired.

In a preferred embodiment, nodes in b-tree 305 are keyed by file system ID, with all events associated with a particular file system object stored in a single node. That is, when an event first touches an object on the file system, the ID used by the file system to identify the object is used as the key for a new node in b-tree 305. The node thus created is then filled with additional information, such as: the type of event and the epochs that were active when the event occurred. When other events happen to the file system object, assuming the node has not been removed from b-tree 305 these additional events are added to the pre-existing node.

The node can store additional information beyond just the file system ID, the type of event, and the epochs active during the event. For example, normally the name of a file is stored in the file's metadata, which can be accessed from the file system using the file system ID. But when a file is deleted, its metadata is lost from the file system. Similarly, when a file is renamed, its original name is lost. To enable an event consumer to know the name of the file that was deleted or renamed, the file's name can be stored in the node in b-tree 305 keyed to the file system ID of the affected file.

B-tree 305 shows three nodes 310, 315, and 320. Node 310 stores a file create event for the file with file system ID 0x04, named 1.txt. The epochs that were active during the file create event were epochs 3 and 4. Node 315 stores a file modify event, which can represent a modification of either the file's data or metadata. The file, identified as file system ID 0x02, was named 2.txt, and the modify event occurred when only epoch 3 was active.

Node 320 is a little different from nodes 310 and 315. Node 320 stores a file delete event. The deleted file had the file system ID of 0x03, and the epochs that were active when the file was deleted were epochs 3 and 5. In this situation, because the name of the file is lost when the event occurs, the name of the file is stored in the node. The name of the file is associated with each epoch active at the time the event occurs. The reason the name is associated with the active epochs, rather than just being stored once in the node, has to do with event compression, and is discussed further below with reference to FIG. 6.

Although b-tree 305 is shown with nodes keyed to the file system ID, a person skilled in the art will recognize that events can be organized in b-tree 305 in other ways. For example, each event occurring on the file system can be assigned a unique event number, which can be used to key into b-tree 305.

Figure 4:
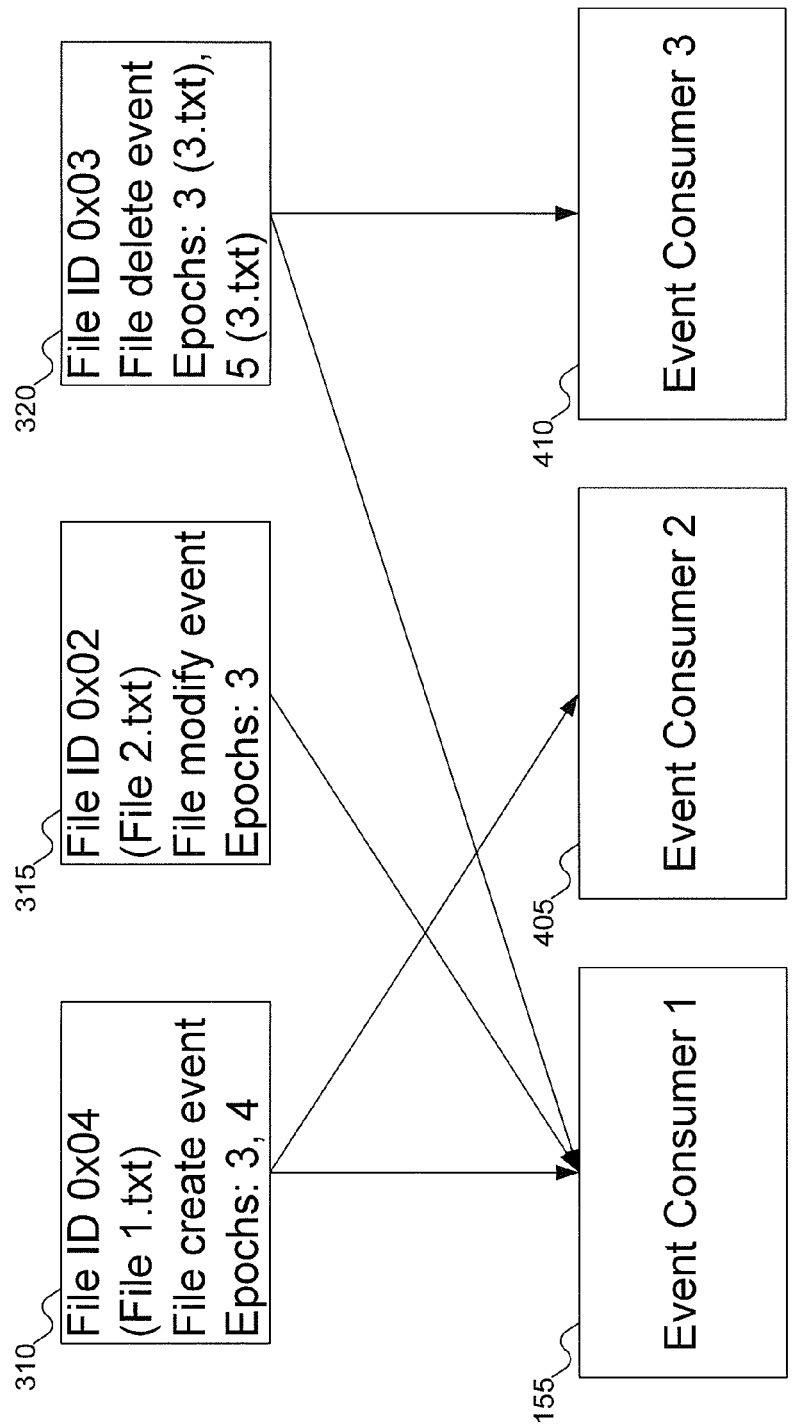
FIG. 4 shows events in the b-tree of FIG. 3 being sent to consumers, according to an embodiment of the invention.

FIG. 4 shows events in the b-tree of FIG. 3 being sent to consumers, according to an embodiment of the invention. Assuming that after the last event occurs in FIG. 2 epochs 3 and 5 (the only active epochs) are ended, FIG. 4 shows which events would be reported to which consumers. Each event consumer is notified of events that occurred during the epoch managed by that event consumer. Since event 310 occurred during epochs 3 and 4, event 310 would be reported to event consumers 1 (155) and 2 (405). Event 315 occurred only during epoch 3, and so would only be reported to event consumer 1 (155). Event 320 occurred during epochs 3 and 5, and so would be reported to event consumers 1 (155) and 3 (410).

Figure 5:
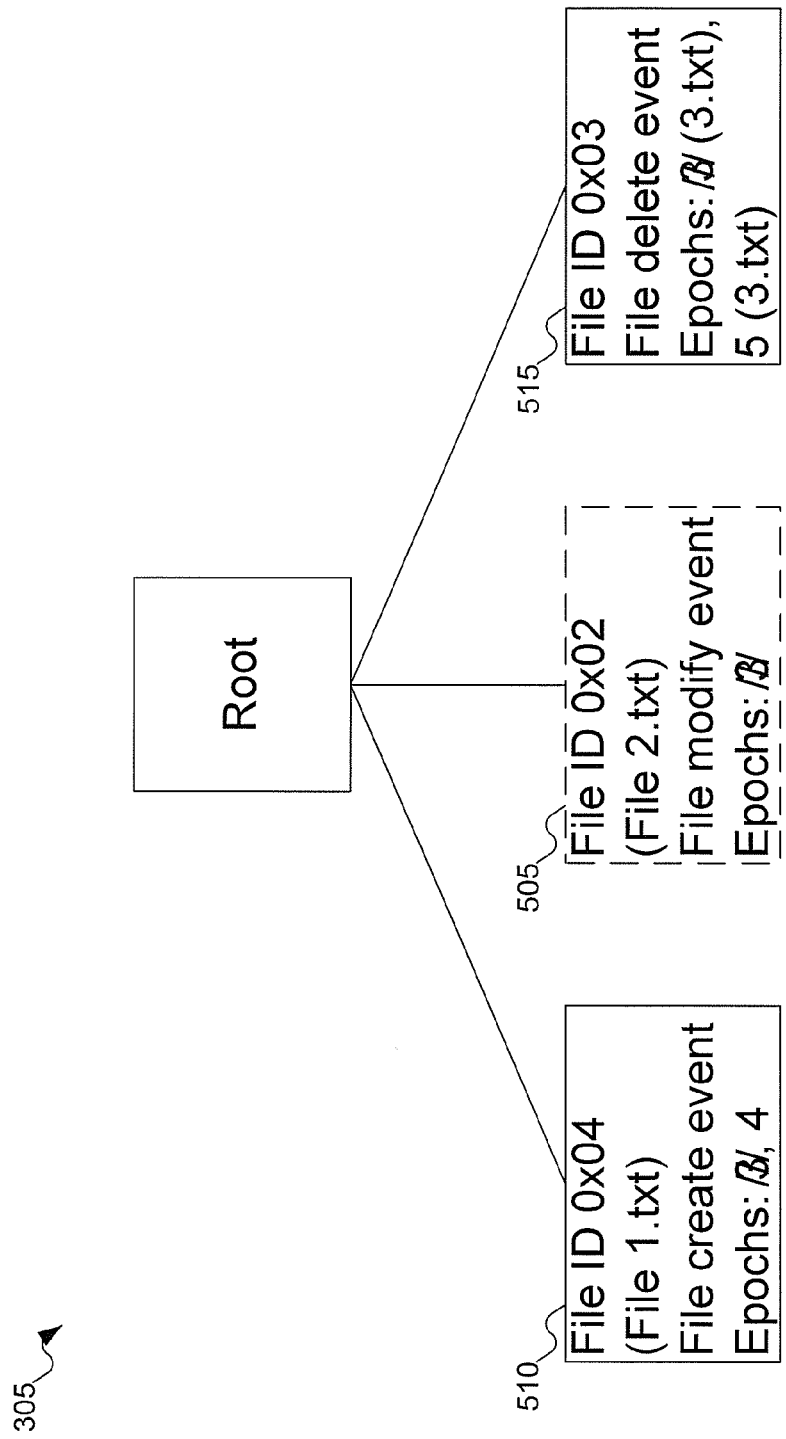
FIG. 5 shows event 505 in the b-tree of FIG. 3 being disassociated from epoch 3, according to an embodiment of the invention.

FIG. 5 shows event 505 in the b-tree of FIG. 3 being disassociated from epoch 3, according to an embodiment of the invention. When event 505 is disassociated from epoch 3, event 505 is no longer associated with any epochs. As a result, event 505 can be removed from b-tree 305 (as shown by the dashed line around event 505). On the other hand, when events 510 or 515 are disassociated from epoch 3, since they are still associated with other epochs, the events are not removed from b-tree 305.

Figure 6:
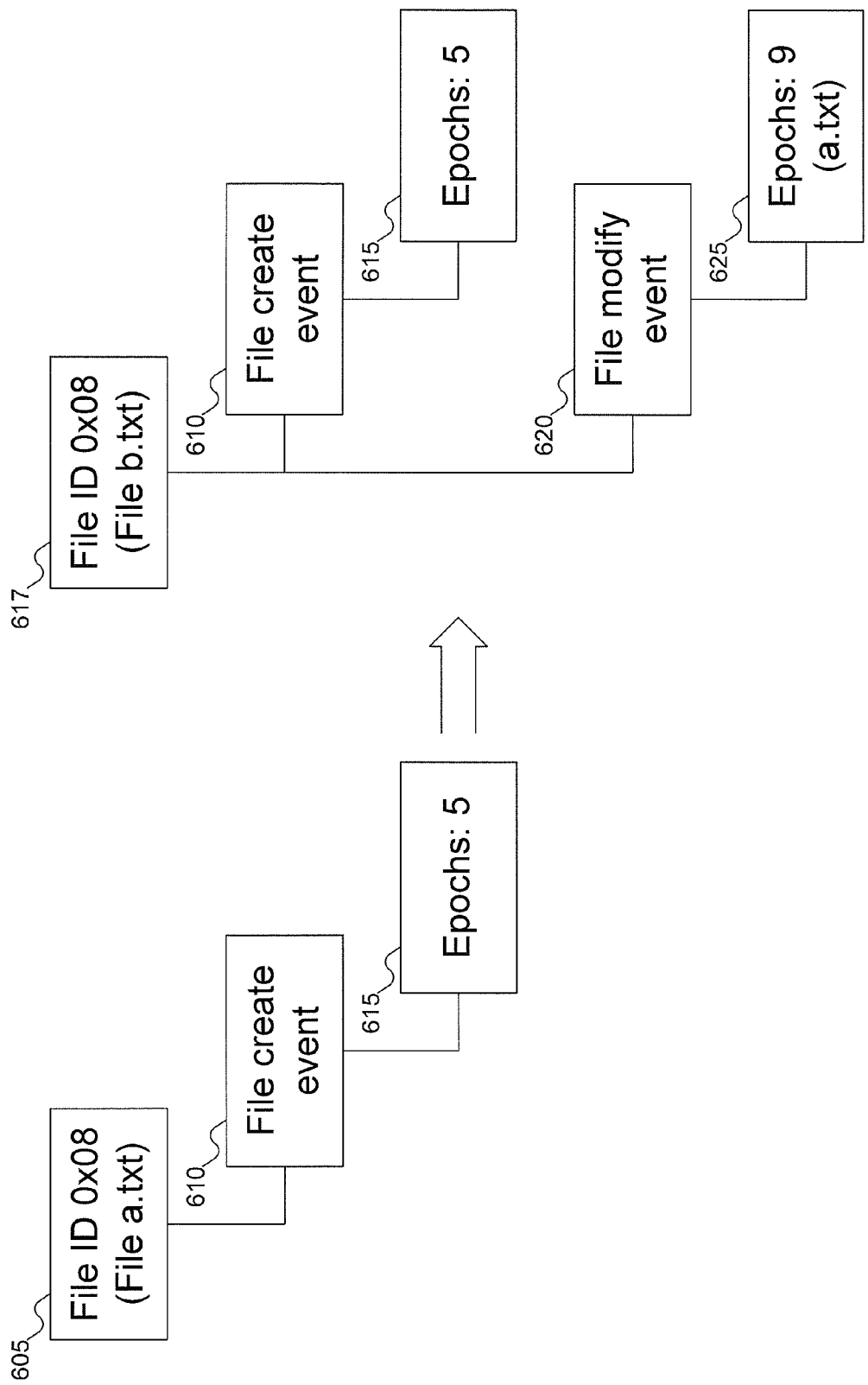
FIG. 6 shows how events are compressed in the computer of FIG. 1, according to a preferred embodiment of the invention.

FIG. 6 shows how events are compressed in the computer of FIG. 1, according to a preferred embodiment of the invention. When events affect the same object on the file system, the events are considered related. For example, events that affect a file are related, as are events that affect the volume as a whole. Although most events occurring on the volume are events affecting files, a person skilled in the art will recognize that events can affect objects other than files: for example, directories on the volume or the volume as a whole. Events can also affect objects off the volume: for example, a connection from the volume to a remote volume.

In FIG. 6, the first event to occur is a file create event for file a.txt. Keying off the file system ID for the newly created file, new node 605 in the b-tree is created. The file create event is included in node 605 (shown as event 610), and epoch 5, the currently active epoch (and shown as epoch 615), is associated with the event. (There can also be other currently active epochs listed in epoch 615.)

At some later point, a new epoch (epoch 9) is started, and at some further point, file a.txt is renamed to file b.txt. When the b-tree is searched for the file system ID of the object (which is the key used in searching the b-tree), node 605 is located. Since a rename is simply a modification of the file metadata, the event is stored as file modify event 620, associated with node 617. (The node is renumbered in FIG. 6 from node 605 to node 617 not because a new node is added to the b-tree, but rather to allow reference to different data stored in the node of the b-tree.) Because epoch 9 is active at the time of the event, epoch 625 identifies epoch 9 as active during the file rename.

Note that epoch 5 is not listed as an active epoch in epoch 625. Instead, because epoch 5 was active at the time of the file create event, the two events (file creation and file rename) can be compressed. If epoch 5 were to end at this point, only one event—file create event 610—would be reported to the event consumer. The fact that the file was created with one name and then renamed to a new name is not important to the event consumer: the event consumer only cares about the fact that there is a new file on the file system, with the file name b.txt.

The rules that explain why epoch 9 is associated with file modify event 620 and epoch 5 is associated only with file create event 610 also apply to any other active epochs. If the epoch was active when the file was created, there is no need to indicate that file modify event 620 also occurred. But if the epoch was not active when the file was created, then the epoch would be associated with file modify event 620.

If the file is later renamed from b.txt to c.txt (and assuming that neither epochs 5 nor 9 are ended before the second file rename), note that node 617 would not change. Epoch 5, having persisted through the file create event and both file modify events, would still compress to a single file create event with the latest file name (now c.txt). Epoch 9, persisting through two file rename events, would compress to a single file modify event, renaming the file from a.txt to c.txt. (Of course, as other epochs start and end between these events, the way the other epochs are stored in node 617 of the b-tree can vary from how epochs 5 and 9 are stored.)

As mentioned above, related events are linked in event list 705 to enable event compression. It is preferred that a minimal number of events be reported to event consumers. For example, if a file is created and then deleted in the same epoch, the event consumer will not be notified about either event. This is useful, for example, where data on the volume is being archived. The archive tool is not interested in knowing about temporary files that were created and deleted since the last archive operation: only the files that are still on the system and have been changed. By compressing events to minimize the number of reported events, such goals are supported.

For example, eventually the event consumer that is using epoch 5 will end the epoch (assuming normal procedure). When the event list manager finds node 617 in the b-tree, the event list manager will report out to the event consumer the create event, identifying the file by its ultimate name. The event consumer will not report out to the event consumer the separate file create and file modify events. On the other hand, when the event consumer that is using epoch 9 requests events, when the event list manager finds node 617 in the b-tree, it will report out the file rename event, and not the file create event. As far as this event consumer is concerned, file a.txt existed when the epoch began. (This can happen, for example, when an event consumer ends one epoch and begins another.)

Figure 7:
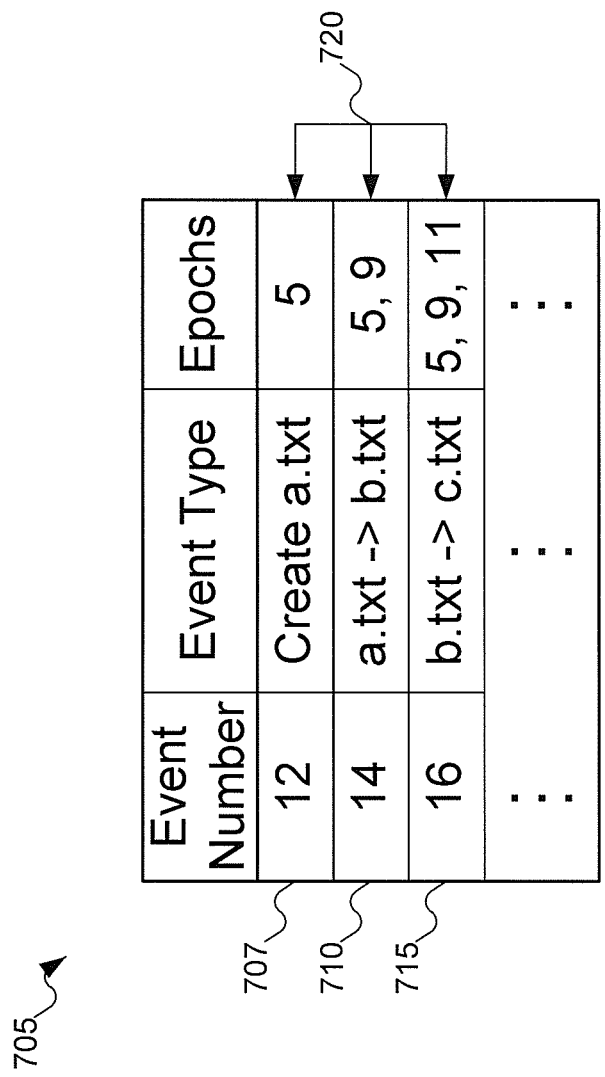
FIG. 7 shows an event list in the computer of FIG. 1 with linked events, according to an embodiment of the invention.

Although FIG. 6 shows a preferred embodiment for managing event compression, a person skilled in the art will recognize that there are other ways to compress events. Instead of compressing events at the time the events occur, the events can be compressed when the event consumer requests the events. FIG. 7 shows an event list in the computer of FIG. 1 with linked events, according to an embodiment of the invention, representing the events explained above with reference to FIG. 6. That is, first file a.txt is created, then the file is renamed to b.txt, and then renamed again to c.txt. In FIG. 7, event list 705 is shown with only the three related events, but a person skilled in the art will recognize that event list 705 can have any number of events, which might or might not be related in any combination. Event 12 (entry 707) identifies the creation of file a.txt. Event 14 (entry 710) identifies that file a.txt was renamed to b.txt. Event 16 (entry 715) identifies that the file b.txt was renamed to c.txt. When events 14 (entry 710) and 16 (entry 715) are added to event list 705, the event list manager searches event list 705 for any related events.

In searching event list 705, the event list manager finds that events 12 (entry 707) and 14 (entry 710) are currently in the event list and affect the same file. (Of course, event 14 (entry 710) is only located in event list 705 when event 16 (entry 715) is added to event list 705.) Accordingly, when the event list manager adds event 14 (entry 710) to event list 705, the event list manager links the two events (shown by link 720). Later, when the event list manager adds event 16 (entry 715) to event list 705, the event list manager updates link 720 to link all three events. Then, when the event list manager later retrieves either event, it will find the link to the other event, which can be used for event compression.

Normally, when the event list manager finds a related event in event list 705, each event is given its own entry in event list 705, and the events are linked. But in the special case where the active epochs for both events are the same, the event list manager can combine the two events with one entry in event list 705. For example, if the only active epochs during event 16 (entry 715) had been epochs 5 and 9, event 14 (entry 710) could have been modified to reflect a single rename from a.txt to c.txt. But since the active epochs at the time of event 16 (entry 715) were different from the active epochs at the time of event 14 (entry 710), these entries cannot be combined.

As described above with reference to FIG. 5, events can be removed when they are no longer associated with any epochs. For example, once event 12 (entry 707) is disassociated from epoch 5, event 12 (entry 707) can be removed from event list 705. In addition, link 720 can be modified to only link events 14 (entry 710) and 16 (entry 715). Later, when epoch 9 is ended and after event 14 (entry 710) has been disassociated from both epochs 5 and 9, event 14 (entry 710) can be removed. At this point, event 16 (entry 715) cannot be compressed with any other events, and link 720 is no longer needed, so it can be removed.

Figure 8A:
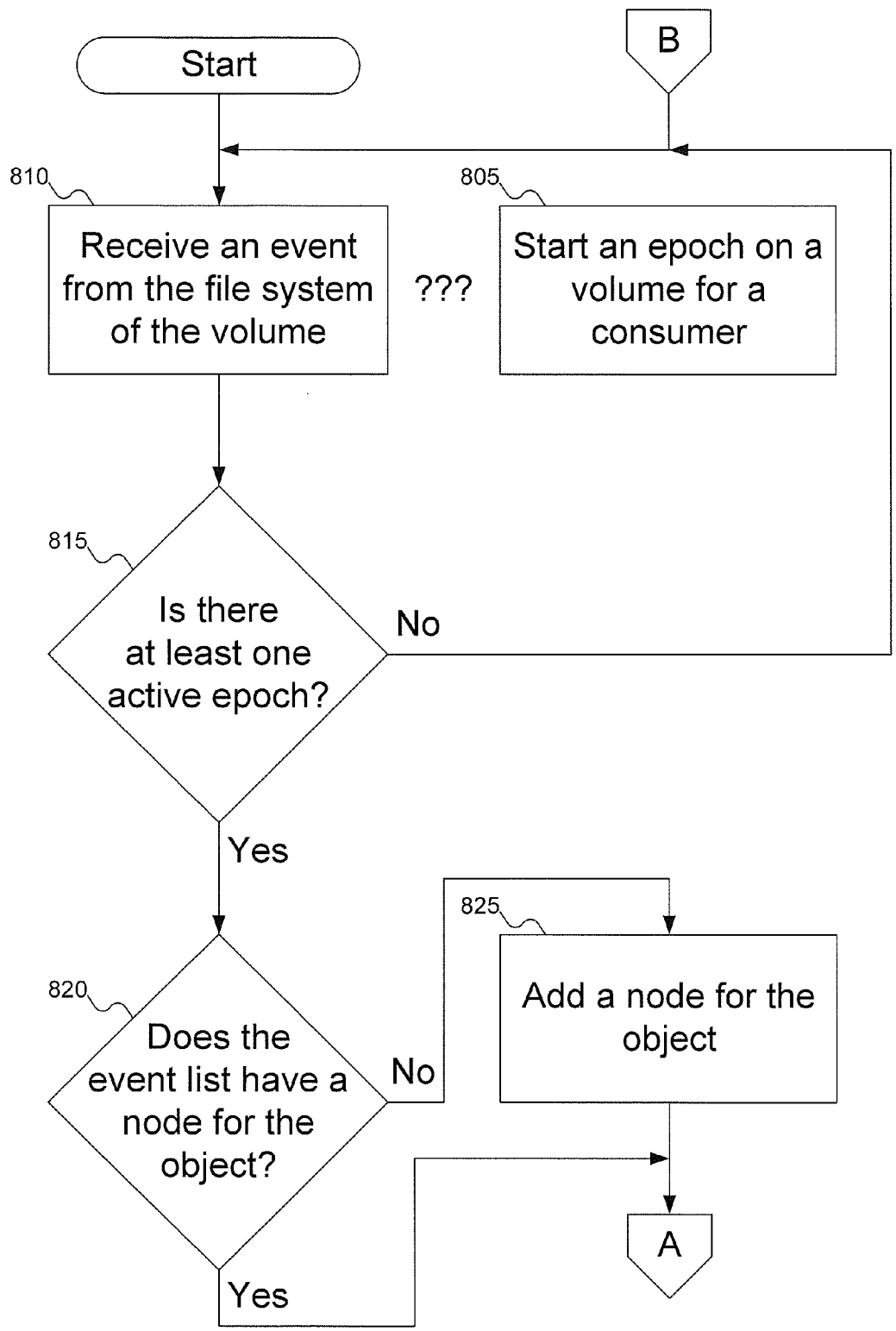
FIGS. 8A-8B show a flowchart of the procedure for associating events with epochs in the computer of FIG. 1, according to an embodiment of the invention.
Figure 8B:
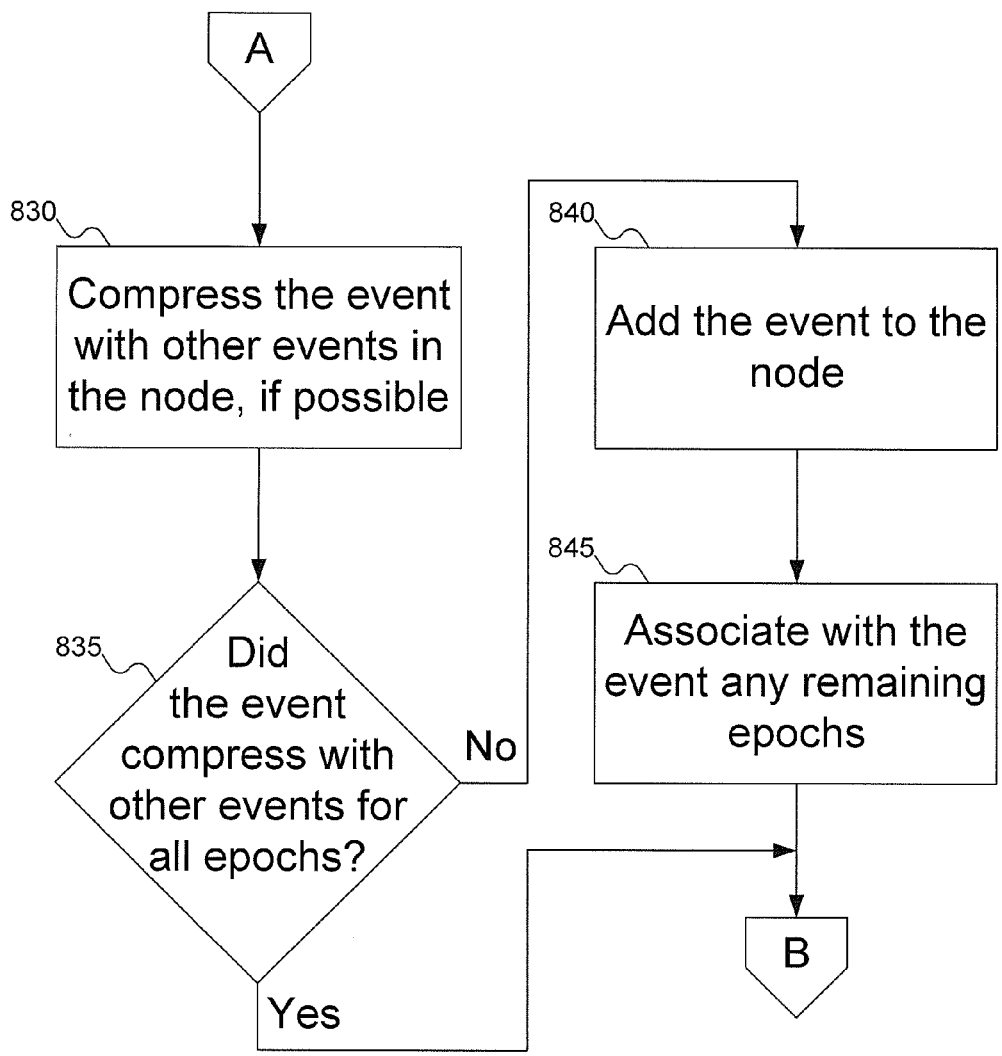

FIGS. 8A-8B show a flowchart of the procedure for associating events with epochs in the computer of FIG. 1, according to an embodiment of the invention. In FIG. 8A, at step 805, an epoch is started for a consumer. Note that step 805 is not located anywhere in particular in the flowchart. This is because step 805 can occur at any time by an event consumer (although each event consumer should have only one epoch open at any time), and can occur more than once (as multiple event consumers can independently start their own epochs).

At step 810, the event list manager receives an event from the file system. At step 815, the event list manager determines if there are any open epochs. If not, then the event does not need to be stored. Otherwise, at step 820 the event list manager checks to see if there is a node for the object in the event list. If not, then at step 825 a node is added to the event list for the object.

At step 830 (FIG. 8B), the event is compressed with any other events in the node. At step 835, the event list manager checks to see if compression has resulted in the event being associated with every active epoch. If not, then at step 840 the event is added to the node, and at step 845 any remaining epochs are associated with the event. Processing resumes at step 810, waiting for another event to be received from the file system.

In a preferred embodiment, compression occurs as described above with reference to FIG. 6. But a person skilled in the art will recognize that compression can occur in other ways. For example, instead of compressing related events in the node, related events can be linked, as described above with reference to FIG. 7. In that case, however, steps 840 and 845 are performed before step 830, so that the event can be linked to related events.

Figure 9A:
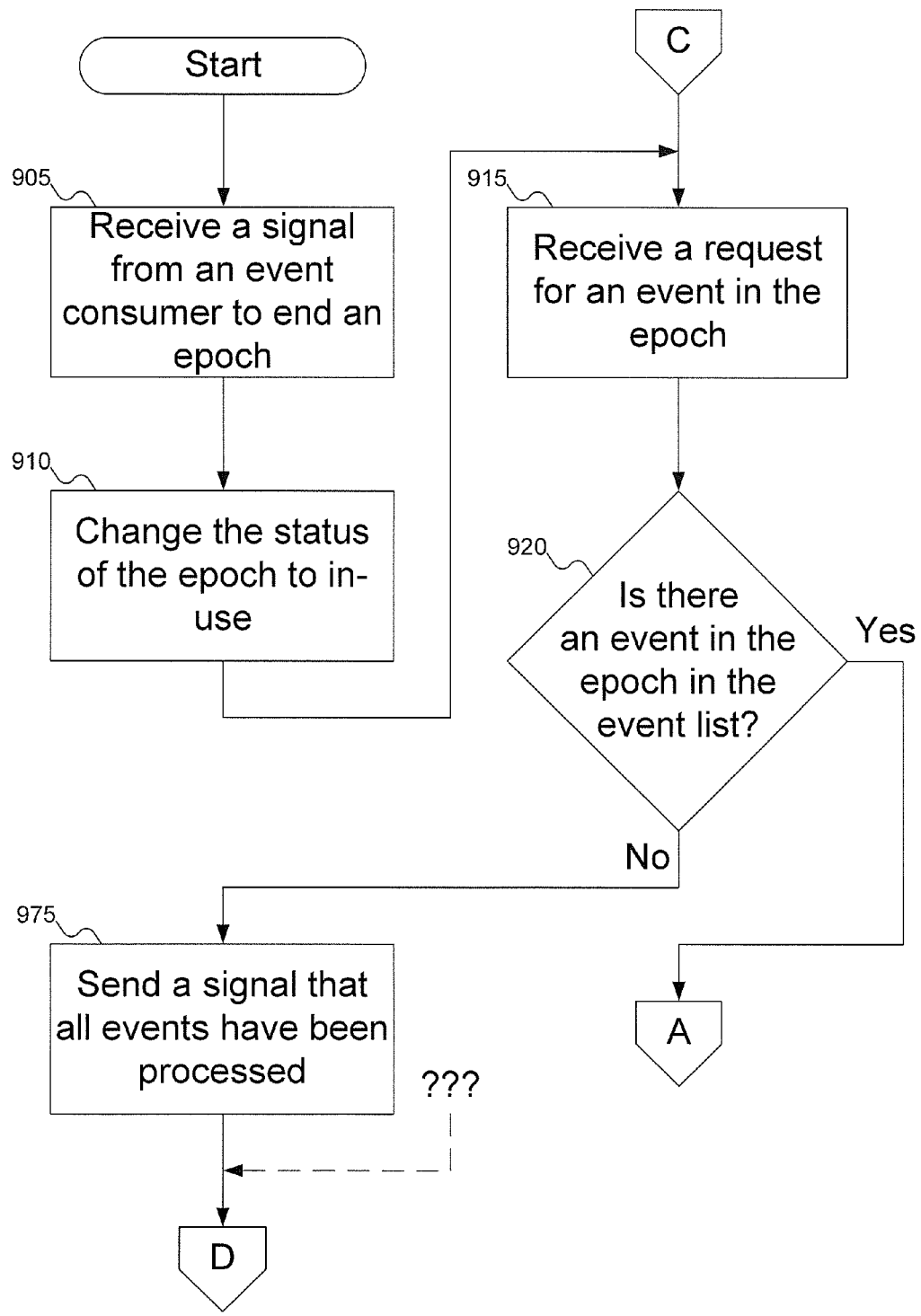
FIGS. 9A-9C show a flowchart of the procedure for sending events in the computer of FIG. 1 to a consumer, according to an embodiment of the invention.
Figure 9B:
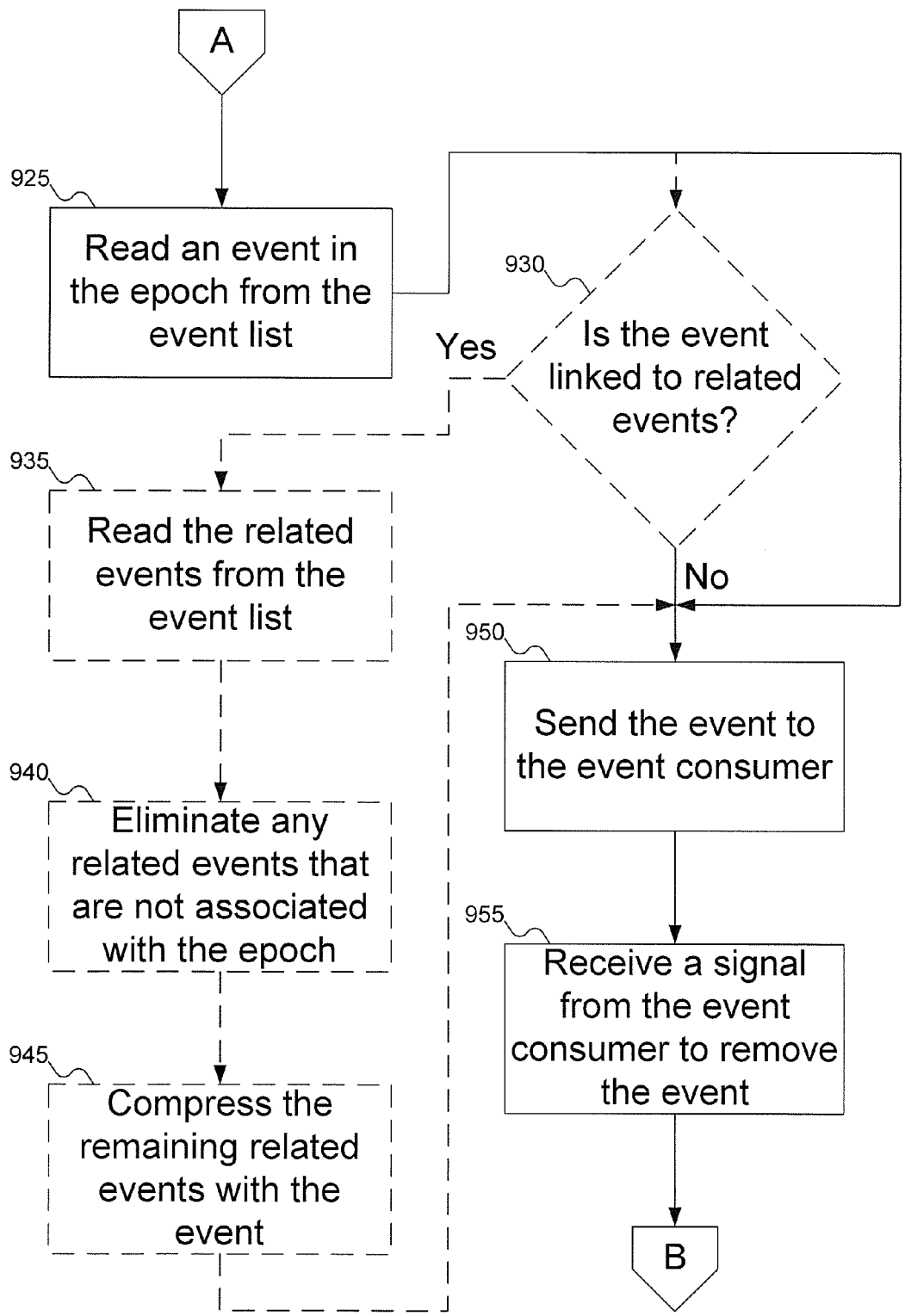
Figure 9C:
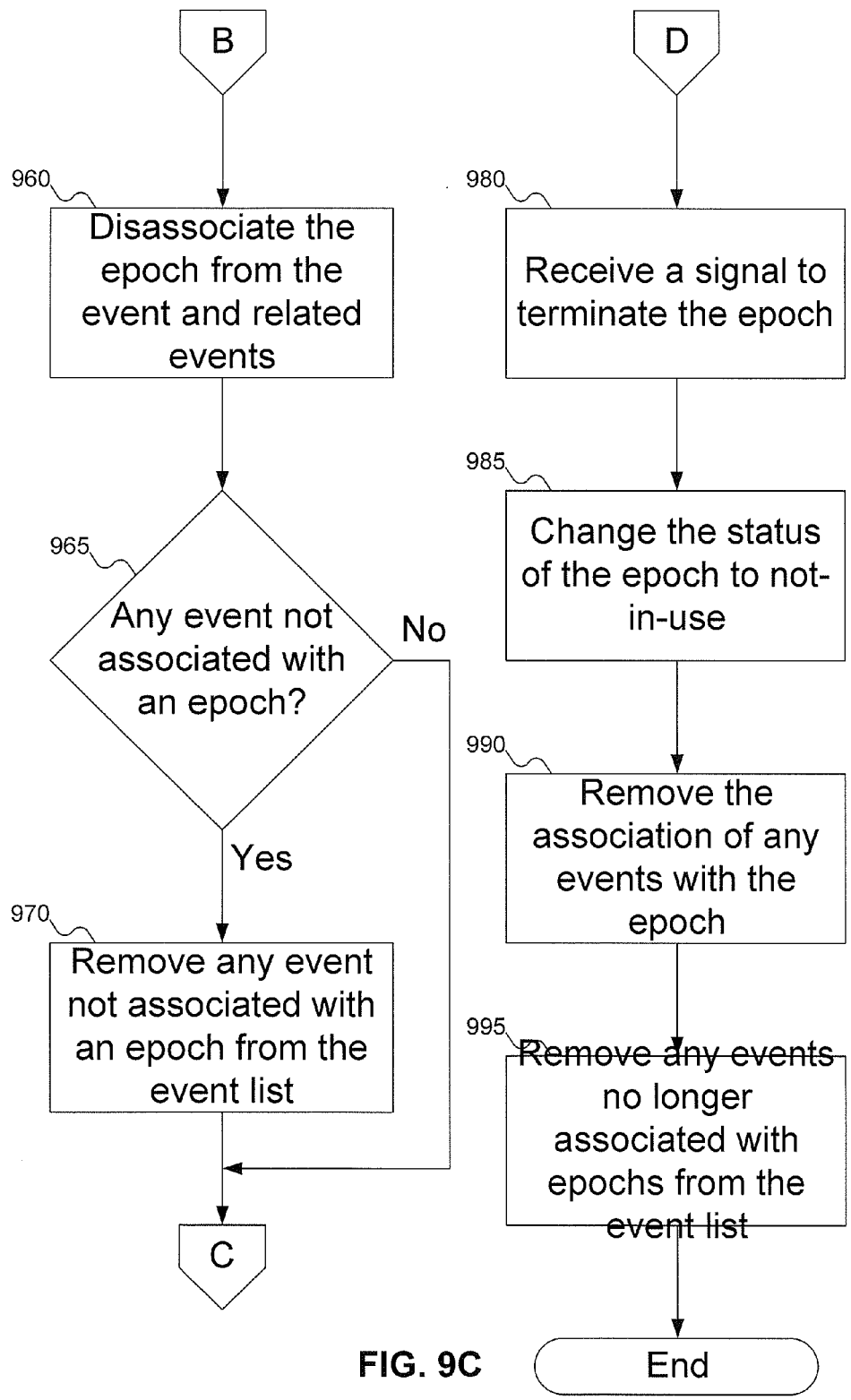

FIGS. 9A-9C show a flowchart of the procedure for sending events in the computer of FIG. 1 to a consumer, according to an embodiment of the invention. In FIG. 9A, at step 905, the event list manager receives a signal to end an epoch for an event consumer. At step 910, the epoch is ended and its status changed to in-use. At step 915, the event list manager receives a request for an event in the epoch. At step 920, the event list manager determines if there is an event in the epoch.

If there is an event associated with the epoch in the event list, then at step 925 (FIG. 9B), the event list manager reads an event in the epoch from the event list. At step 930 the event list manager determines if the event is linked to any related events. If so, then at step 935, the event list manager reads the related events. At step 940, the event list manager eliminates any related events that are not associated with the epoch, and at step 945 the event list manager compresses the remaining related events with the event read at step 925. The event (compressed with any related events that occurred during the epoch) is sent to the event consumer at step 950. At this point, the event consumer can process the event. At step 955, the event list manager receives a signal to remove the event.

Note that steps 930-945 are shown with dashed lines. As described above with reference to FIG. 6, in a preferred embodiment related events are compressed at the time the events occur. In the preferred embodiment, step 950 immediately follows step 925, as there is no need to perform event compression when the event is requested. Steps 930-945 are performed when events are compressed at the time an event is requested, as described above with reference to FIG. 7.

In a preferred embodiment, step 925 is only guaranteed to locate an event in the epoch, if one exists. There is no guarantee about which event will be accessed by the event list manager. For example, there is no guarantee that events will be reported to the event consumer in the order in which they occurred. But a person skilled in the art will recognize that the operation of the event list manager can be modified as desired to achieve specific behaviors. For example, by keying events in the b-tree to unique event numbers assigned sequentially, the event list manager can be designed to return events to the event consumer in the order in which the events occurred.

At step 960 (FIG. 9C), the event list manager disassociates the epoch from the event and any related events. At step 965, the event list manager determines if the event or any of the related events are no longer associated with an epoch. If the event or any of the related events are no longer associated with an epoch, then at step 970 the event list manager removes the event or related events no longer associated with an epoch from the event list. In the preferred embodiment, where a b-tree is used to store the event list and nodes in the b-tree are keyed by the file system ID, if there are no events associated with the node in the b-tree then the node can also be removed from the b-tree at step 970. Processing then continues with step 915 of FIG. 9A.

A person skilled in the art will recognize that the order of steps 915-970 as shown in FIGS. 9A-9C is suggested, but not required. For example, an event consumer might choose to process events from the epoch without signaling that the events be removed from the event list. Alternatively, the event consumer might process some events, signal that they be removed, then process other events, and so on. For simplicity of representation, FIGS. 9A-9C show the event consumer processing an event and requesting the event be removed before requesting a new event, but a person skilled in the art will recognize that the order of steps shown in FIGS. 9A-9C is not binding.

Eventually, the event list manager will find no further events associated with the epoch. At that point, in step 975 of FIG. 9A the event list manager sends a signal that all events in the epoch have been processed. But it can happen that the event consumer will decide on its own to terminate event processing, even though there might be events still associated with the epoch. (Note the dashed line on FIG. 9A, leading into the branch to step 980.) In any event, once step 980 (FIG. 9C) is reached, the event list manager receives a signal to terminate an epoch. At step 985, the epoch's status is changed to not-in-use. At step 990, any remaining events associated with the epoch are disassociated with the epoch, and at step 995, any events that are no longer associated with any epochs are removed from the event list.

A person skilled in the art will recognize that the order of steps 915-970 as shown in FIGS. 9A-9C is suggested, but not required. For example, an event consumer might choose to process events from the epoch without signaling that the events be removed from the event list. Alternatively, the event consumer might process some events, signal that they be removed, then process other events, and so on. For simplicity of representation, FIGS. 9A-9C show the event consumer processing an event and requesting the event be removed before requesting a new event, but a person skilled in the art will recognize that the order of steps shown in FIGS. 9A-9C is not binding.

Figure 10:
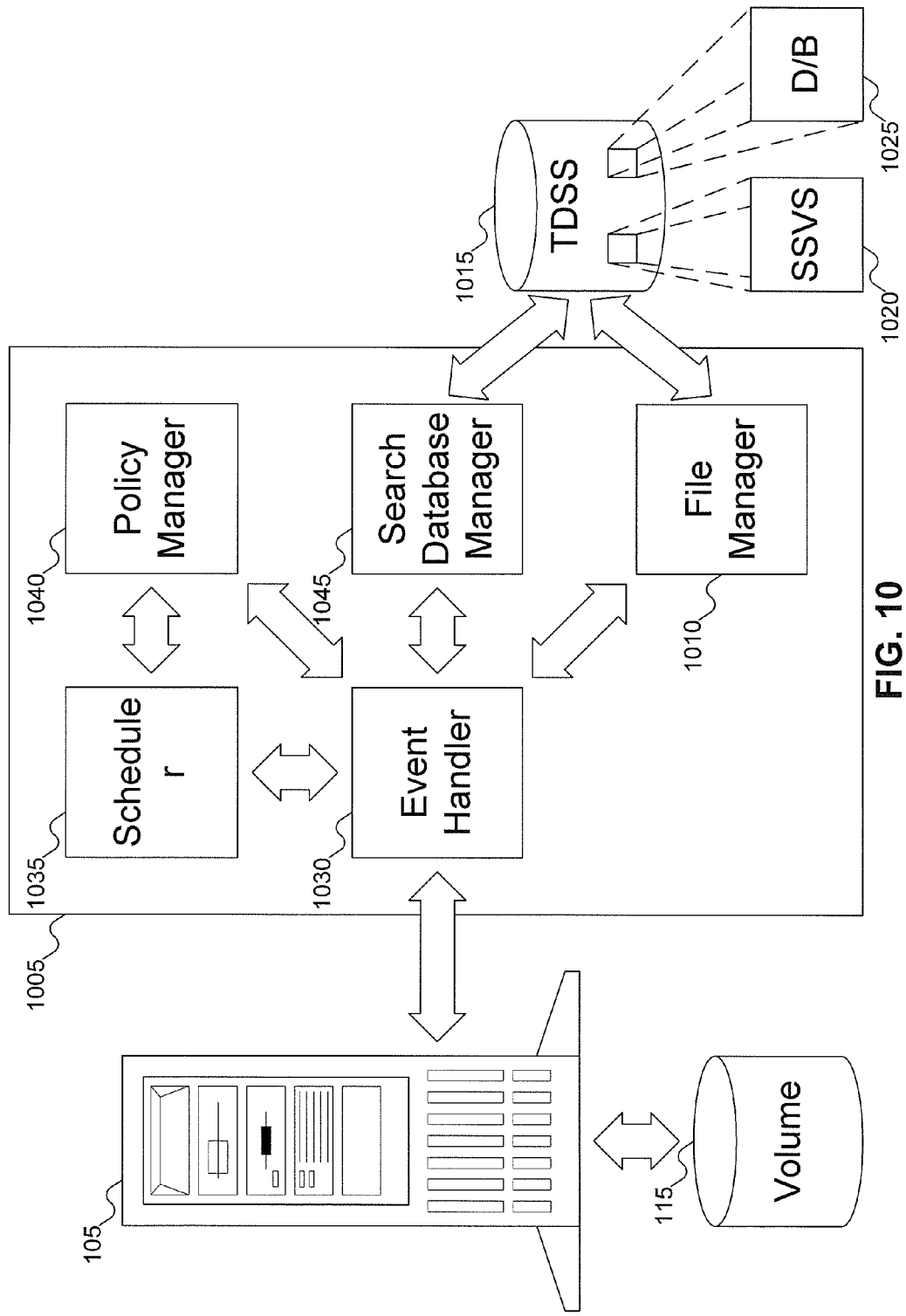
FIG. 10 shows a time domain server interacting with a source server, such as the computer of FIG. 1, to store data and metadata, according to an embodiment of the invention.

As mentioned above, one use of epochs is to support file archival operations. FIG. 10 shows a time domain server interacting with a source server, such as the computer of FIG. 1, to store data and metadata, according to an embodiment of the invention. Time domain server 1005 includes file manager 1010, which interacts with time domain server storage 1015. Time domain server storage 1010 can be any variety of storage, from an individual volume physically connected to time domain server 1005, to wireless storage, to a storage area network, among others. Depending on the particular implementation of time domain storage server 1015, file manager 1010 and the connection between time domain server 1005 and time domain server storage 1015 can vary.

Time domain server storage 1015 includes source server version storage 1020 and database 1025. Source server version storage 1020 stores versions of files retrieved from the various source servers, such as server 105 and its associated volume 115. Although a network connection is not shown between time domain server 1005 and server 105, a person skilled in the art will recognize that time domain server 1005 and source server 105 typically communicate across a network, and that the network can be of any known variety, such as local area networks (LANs), wide area networks (WANs), or wireless networks (such as those using Bluetooth or any of the IEEE 802.11 standards).

Database 1025 provides for indexing of data stored in source server version storage 1020. Database 1025 stores information about the files in source server version storage 1015, indexing the file data (that is, content) and metadata (that is, information about the file, such as file name, size, date last modified, etc.) Database 1025 can also store access control information for the files in source server version storage 1020. Access control information controls which users can access particular files. For example, if a user is not permitted access to a file on source server 105, then that user is to be denied access to copies of the file stored in source server version storage 1020 on time domain server storage 1015 of time domain server 1005.

Although FIG. 10 shows time domain server 1005 in communication with only one source server (server 105), time domain server 1005 can support multiple source servers. That is, there can be any number of source server version storages 1020 in time domain server storage 1015: one for each volume time domain server 1005 supports. Similarly, there is preferably a different database 1025 associated with each source server version storage 1020, indexing the files in that particular source server version storage 1020.

Although FIG. 10 describes time domain server 1005 by itself, a person skilled in the art will recognize there can be more than one time domain server. Each time domain server can be configured to support as many source servers as desired. In addition, there can be overlap in the source servers supported by each time domain server. That is, a single source server can be archived by more than one time domain server. In such a situation, each time domain server archiving the source server can use its own epoch declaration to archive the source server, without needing to coordinate with the other time domain servers supporting the source server. Each time domain server acts as an event consumer of the source server, as described above with reference to FIGS. 1-9C, and each time domain server operates independently of any other time domain servers.

Aside from time domain server storage 1015, time domain server 1005 includes event handler 1030, scheduler 1035, policy manager 1040, and search database manager 1045. Event handler 1030 is responsible for managing epochs and events from server 105. Specifically, event handler 1030 requests the start and end of an epoch, requests events from server 105, and processes the events. Scheduler 1035 is responsible for determining when to request events from server 105 (that is, when the epoch is to end). Scheduler 1035 interfaces with policy manager 1040 to determine how long time domain server 1005 is to go between copying files from server 105.

Aside from instructing scheduler 1035 as to when to declare the end of an epoch, policy manager 1040 has other responsibilities. Among others, policy manager 1040 stores the policy that decides whether or not a particular file is to be archived. Policy manager 1040 is also responsible for determining when to delete versions of files stored on time domain server storage 1015 (for example, when the versions have been around too long, or when there are too many versions of the file in time domain server storage 1015).

Search database manager 1045 is responsible for interfacing with database 1025 on time domain server storage 1015. Search database manager 1045 updates database 1025 to index newly stored files. Search database manager 1045 also supports client requests for archived files (described further below with reference to FIGS. 12 and 15A-15C).

Figure 11:
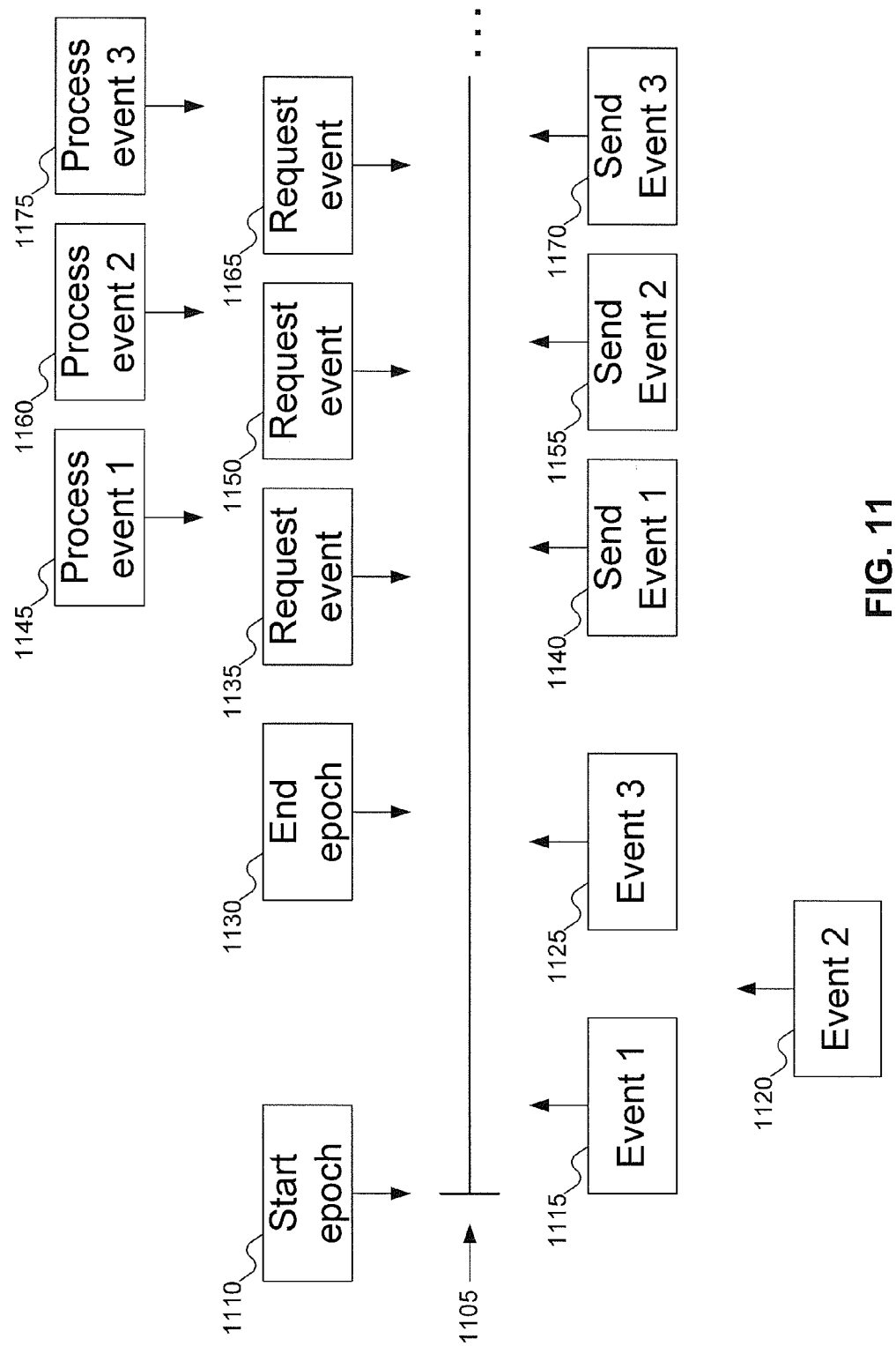
FIG. 11 shows a timeline of events occurring during an epoch that are returned to the time domain server of FIG. 10, according to an embodiment of the invention.

FIG. 11 shows a timeline of events occurring during an epoch that are returned to the time domain server of FIG. 10, according to an embodiment of the invention. Timeline 1105 shows events occurring as time moves from left to right; events above timeline 1105 occur in the time domain server, and events below timeline 1105 occur in the source server. At box 1110, the time domain server declares the start of an epoch. Events 1115, 1120, and 1125 occur at various times in the source server. Eventually, at box 1130, the time domain server declares the end of the epoch. Eventually, at box 1135, the time domain server requests an event, and the source server transmits event 1 at box 1140. Preferably, the source server transmits events in chronological order, but a person skilled in the art will recognize that events can be transmitted in any order. At box 1145, the time domain server processes the event. This process repeats for other events (for example, as shown in boxes 1150, 1155, 1160, 1165, 1170, and 1175), until the source server has transmitted all events to the time domain server.

Although FIG. 11 shows the individual events 1115, 1120, and 1125 being transmitted to the time domain server, the events transmitted to the time domain server can be compressed, as described above with reference to FIG. 7. That is, the events transmitted in boxes 1140, 1155, and 1170 can be compressed events, including information from more than one individual event.

Figure 12:
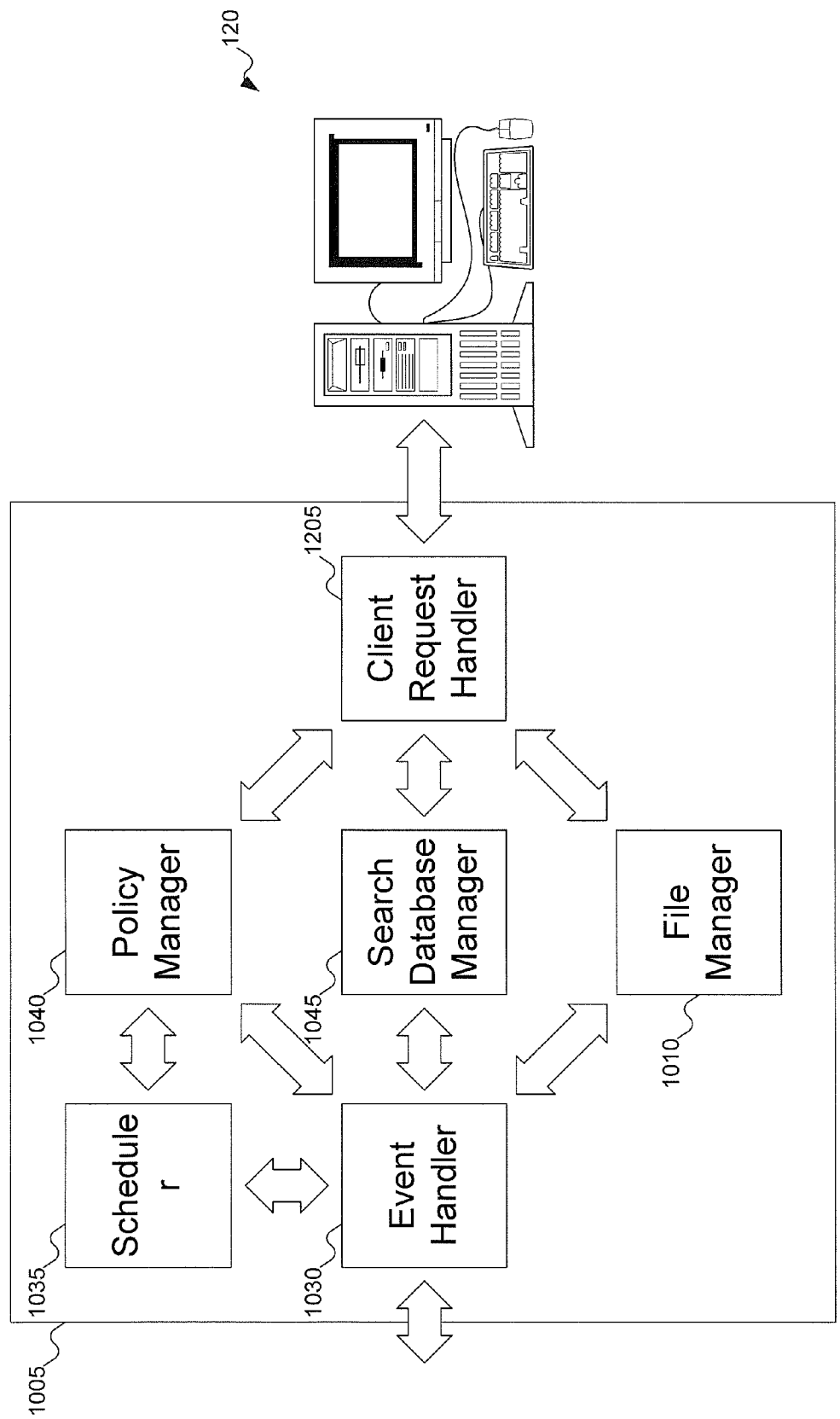
FIG. 12 shows the time domain server of FIG. 10 interacting with a client, according to an embodiment of the invention.

Although FIGS. 10-11 show the time domain server only interacting with the source server, the time domain server is also capable of interacting with clients, to allow clients to access, copy, restore, etc. files stored by the time domain server. This is shown in FIG. 12. In FIG. 12, time domain server 1005 includes client request handler 1205, which allows client 120 to interface with time domain server 1005. Preferably, client request handler 1205 provides a browser interface to time domain server 1005, as a browser interface is independent of any particular hardware or software on either time domain server 1005 or client 120, but hardware/software-specific implementations of client request handler 1205 are possible.

Client request handler 1205 allows clients to request access to files. In a preferred embodiment, client request handler 1205 also handles all requests to the source server, and is implemented in such a way that client 120 is not even aware that time domain server 1005 resides between client 120 and the source server.

An advantage of having client request handler 1205 act as a gateway between client 120 and the source server is that client request handler can integrate data from time domain server 1005 with data from the source server. To accomplish this integration, when client 120 makes a request, the request is forwarded to the source server and to search database manager 1045. Search database manager 1045 requests all files satisfying the query that client 120 is entitled to access (using the access control information associated with each file to determine which files client 120 is entitled to access). The results of the query returned from search database manager 1045 are integrated with the results of the query returned from the source server.

Figure 13:
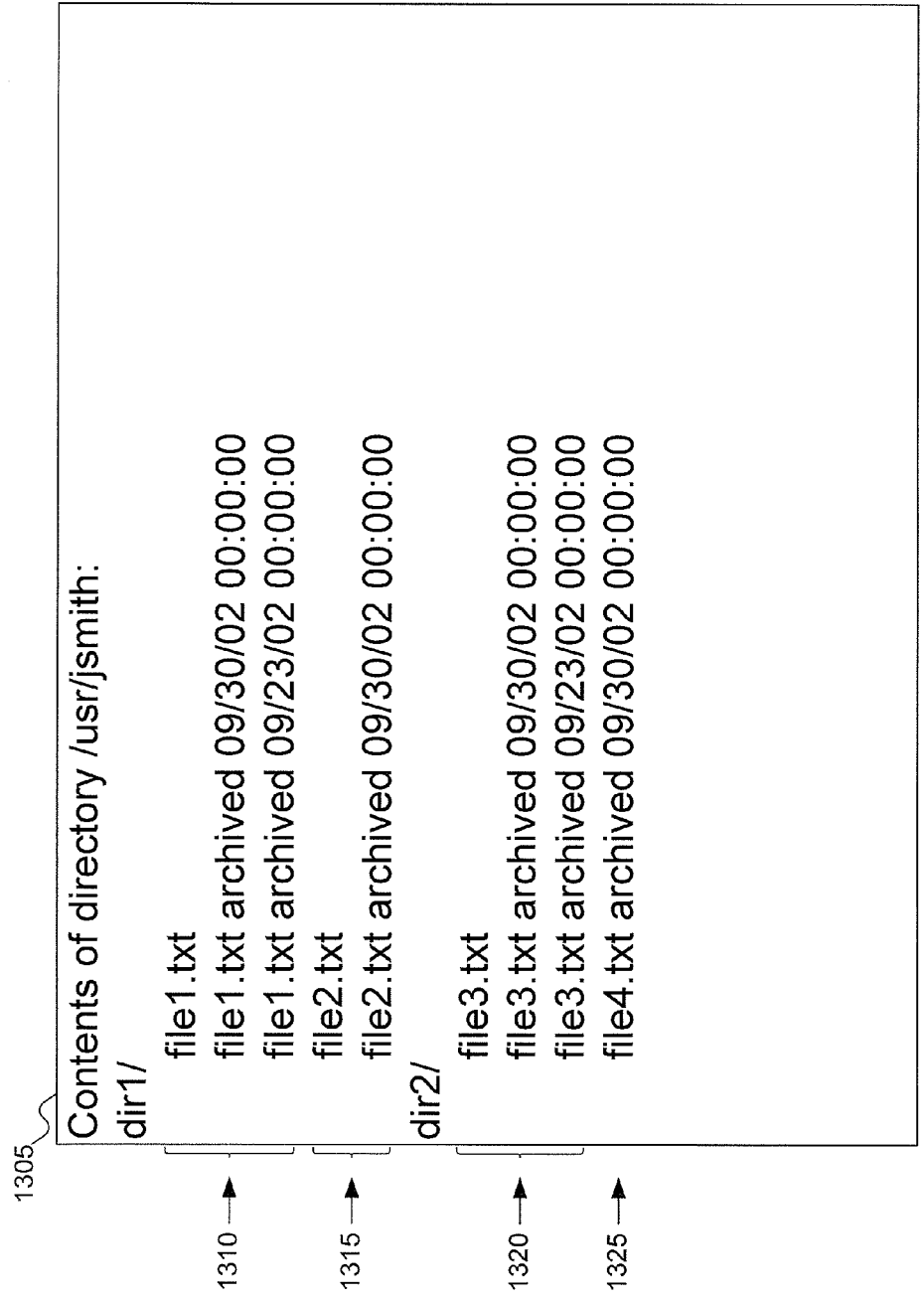
FIG. 13 shows a display returned to a client of FIG. 12 by the time domain server of FIG. 12, according to an embodiment of the invention.

An example of this process is shown in FIG. 13. In FIG. 13, the user has requested a listing of all files in directory /usr/jsmith. The query is forwarded to both the source server and the search database manager, as described above. The source server returns that /usr/jsmith has two subdirectories dir1 and dir2. Directory /usr/jsmith/dir1 has two files in it: file1.txt and file2.txt. Directory /usr/jsmith/dir2 has one file in it: file3.txt. Similarly, the query is passed to the search database manager, which returns the same directory structure, but a different file list. The search database manager reports that there are two archived versions of file1.txt in directory /usr/jsmith/dir1, one archived version of file2.txt in directory /usr/jsmith/dir1, and two archived versions of file3.txt in /usr/jsmith/dir2. The search database manager also reports that there is an archived version of file file4.txt in /usr/jsmith/dir2, a file which is not reported by the source server (perhaps the file was deleted from the source server since the last time the time domain server requested events from the source server).

The client request handler integrates all of the data, which is shown in display 1305 of FIG. 13. Note that rows 1310 indicate to the user that file1.txt is in /usr/jsmith/dir1, and that there are two archived versions of the file. Similarly, rows 1315 and 1320 present information about available versions of file2.txt in /usr/jsmith/dir1 and file3.txt in /usr/jsmith/dir2. Finally, note row 1325, which shows the old version of file4.txt available.

The client can then request to access one of the files. If the client requests to access one of the files on the source server, the request is forwarded to the source server for processing. Where the request is forwarded to the source server, whether the request is allowed or not is determined by the source server. For example, if the user has permission to read from the file but not to write to the file, the source server is left to determine whether the access request is a read or write request.

If the client requests to access a file from the time domain server, then the time domain server processes the request. The access control information stored in the database is used to determine if the request is permitted, in the same way that the source server would process a request. But in addition, the policy manager is accessed to determine if the type of operation requested by the client is permitted. For example, the client might request to restore an older version of the file to the source server, or to make a local copy of the older version of the file on the client machine, among other requests. Whether these types of requests are permitted is determined by the policy on the time domain server.

Although FIG. 13 shows the result of a query for files in a directory, a person skilled in the art will recognize that the query can take on other forms. For example, the query can request all files created on or after a certain date. Or the query can request all files including a search term. Other queries are also possible.

Figure 14A:
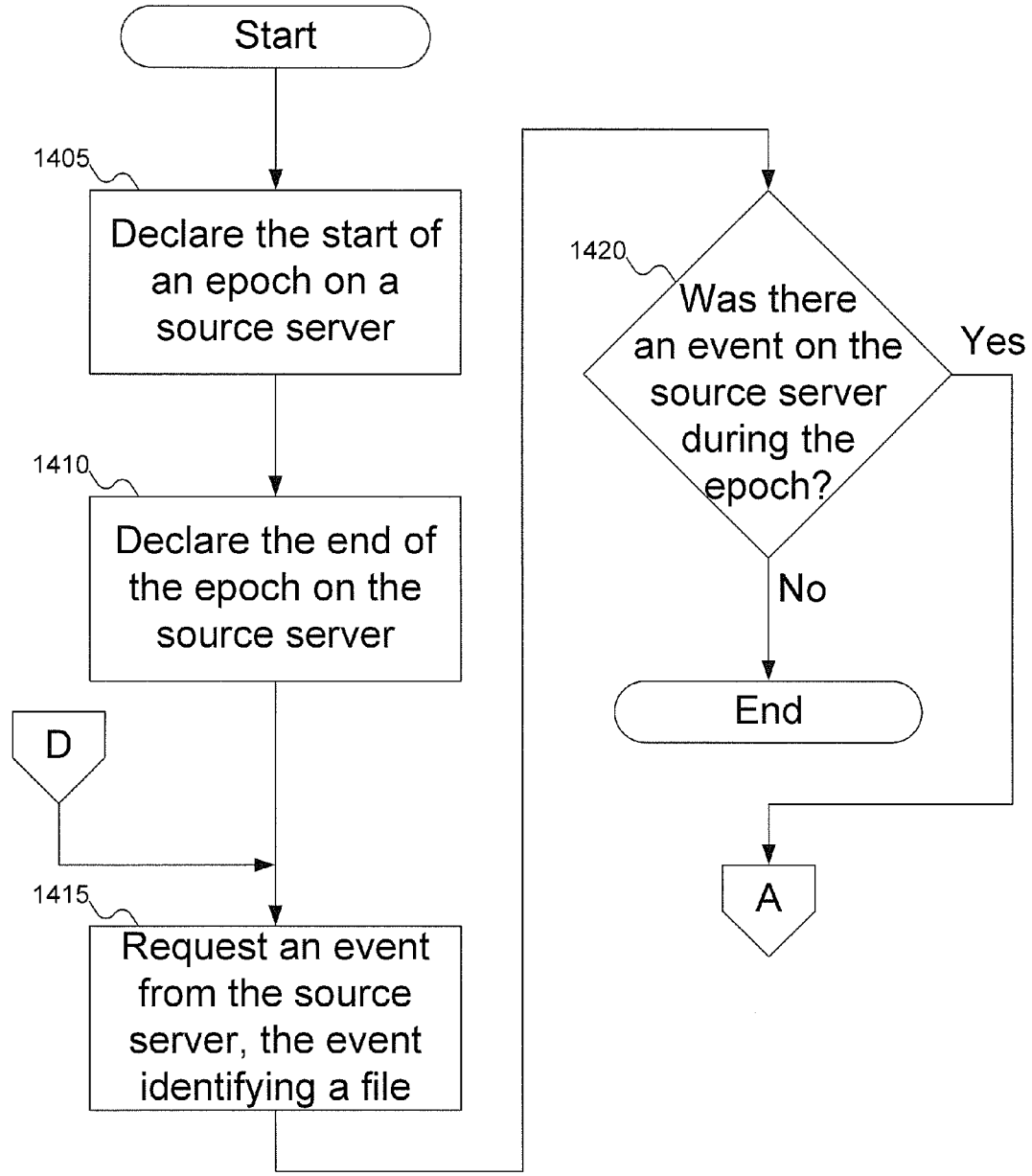
FIGS. 14A-14C show a flowchart of the procedure for storing changes on the time domain server of FIG. 10, according to an embodiment of the invention.
Figure 14B:
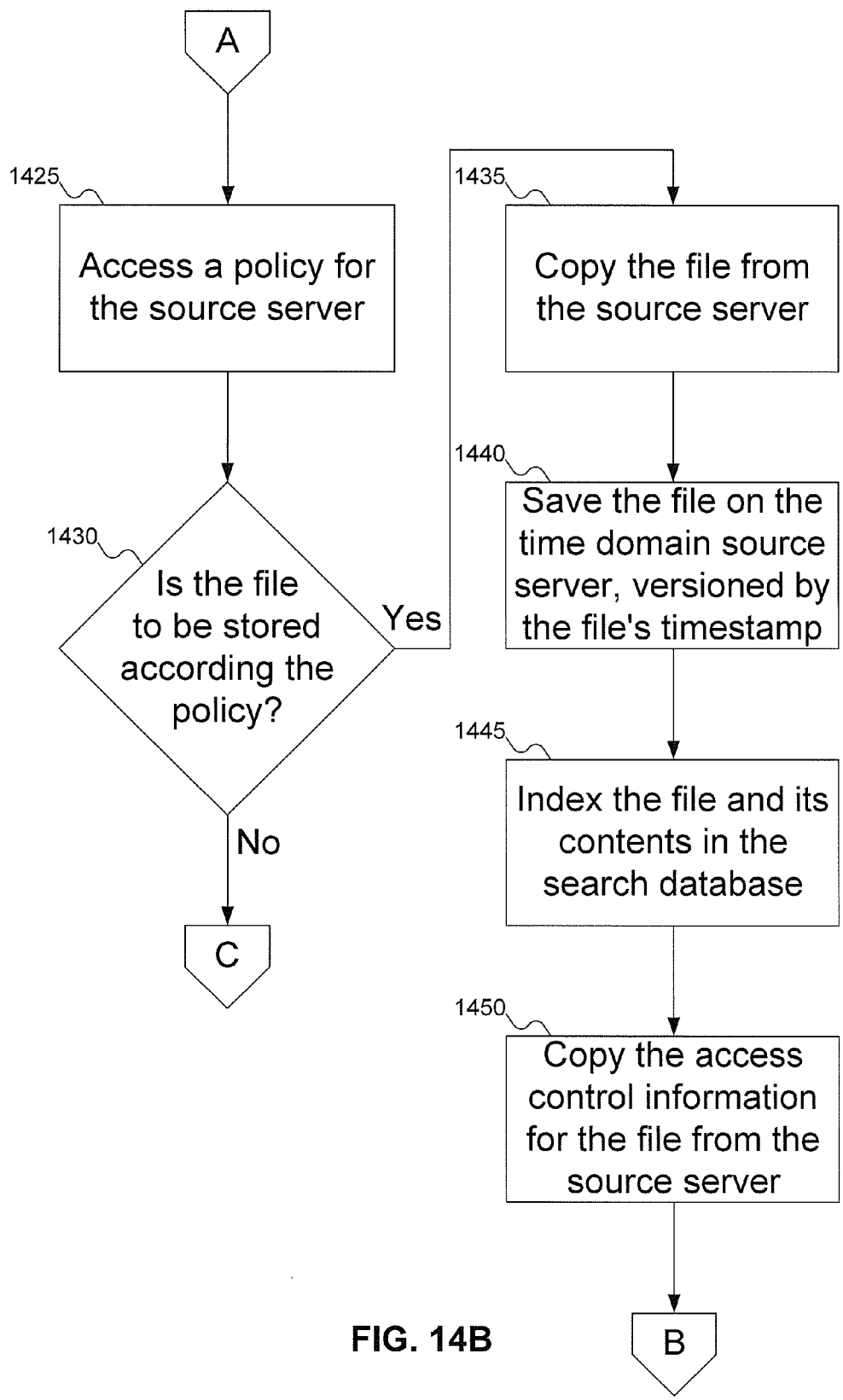
Figure 14C:
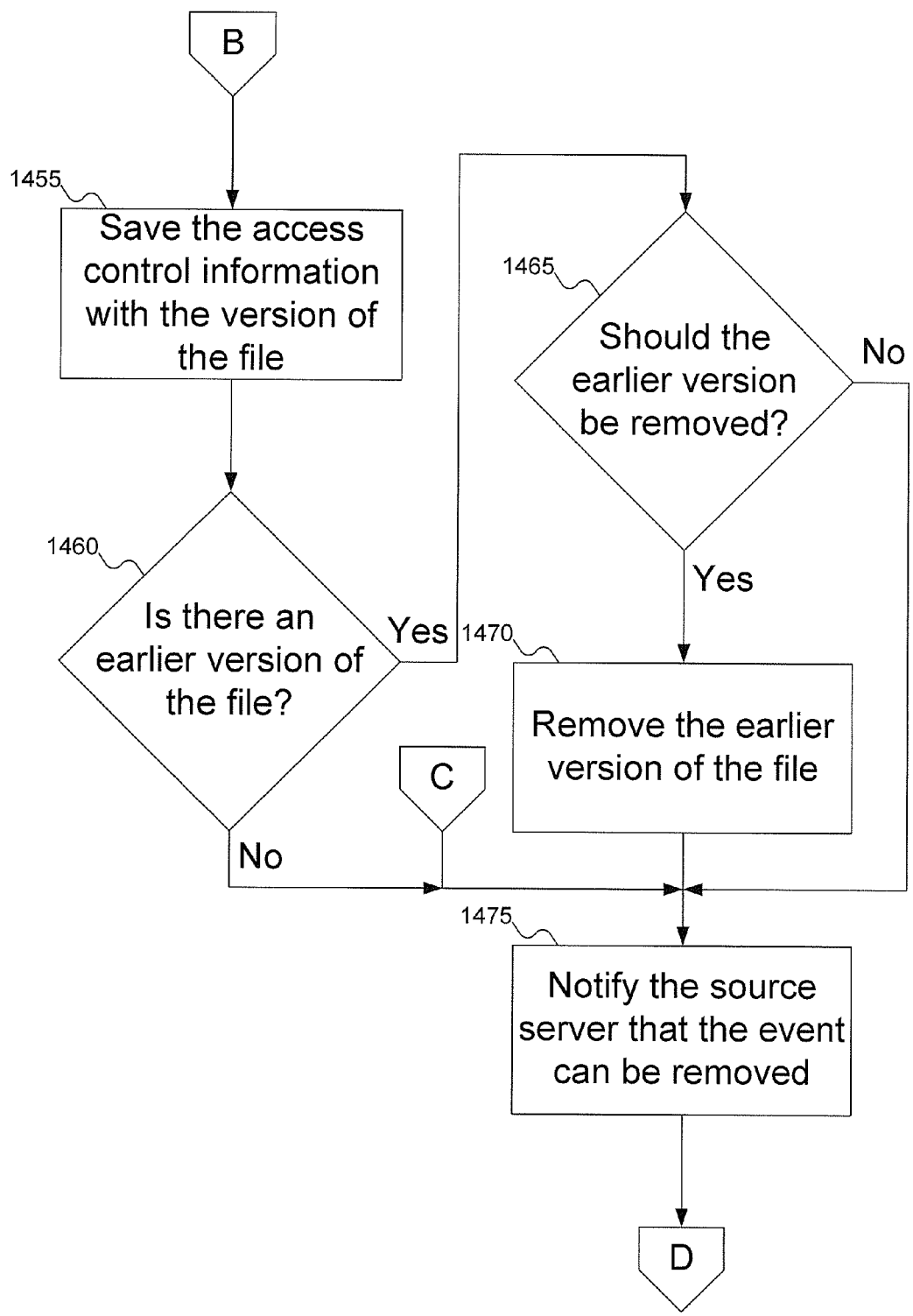

FIGS. 14A-14C show a flowchart of the procedure for storing changes on the time domain server of FIG. 10, according to an embodiment of the invention. At step 1405, the time domain server declares the start of an epoch. At step 1410, the time domain server declares the end of the epoch. As should be apparent, steps 1405 and 1410 do not have to occur in short proximity of time, but can be separated by any desired length of time: an hour, a day, a week, etc. At step 1415, the time domain server requests an event from the source server. At step 1420, the source server checks to see if there was an event during the epoch. If the source server reports that there are no remaining events during the epoch, then the time domain server has finished updating the source server version storage.

On the other hand, if the source server indicates that there was an event, then at step 1425 (FIG. 14B) the time domain server accesses a policy for the source server. At step 1430, the time domain server checks to see if the policy indicates that the file should be stored in the source server version storage. If so, then at step 1435, the file is copied from the source server. At step 1440, the file is stored in the source server version storage, versioned by the timestamp (so that different versions of the same file can be stored at the same time). At step 1445, the file and its contents are indexed in the search database. At step 1450, the access control information for the file is copied from the source server, and at step 1455 (FIG. 14C) the access control information for the file is stored.

At step 1460, the time domain server determines if there is an earlier version of the file. At step 1465, assuming there is an earlier version of the file, the time domain server checks the policy to determine if the earlier version of the file should be removed. As discussed above, the policy can indicate that archived files should be removed after a certain duration of time, or if there are too many versions of the file, among other reasons. If the earlier version of the file is to be removed, then at step 1470 the earlier version is removed. At step 1475, the time domain server notifies the source server that the event can be removed, and processing returns to step 1415 of FIG. 14A.

A person skilled in the art will recognize that the flowchart shown in FIGS. 14A-14C is one of many different sequences of steps that can be used to achieve the same results. For example, steps 1460-1470 can be performed separately on every file in the source server version storage after all events are processed, as the policy might require the removal of a file for which no event was received from the source server.

Figure 15A:
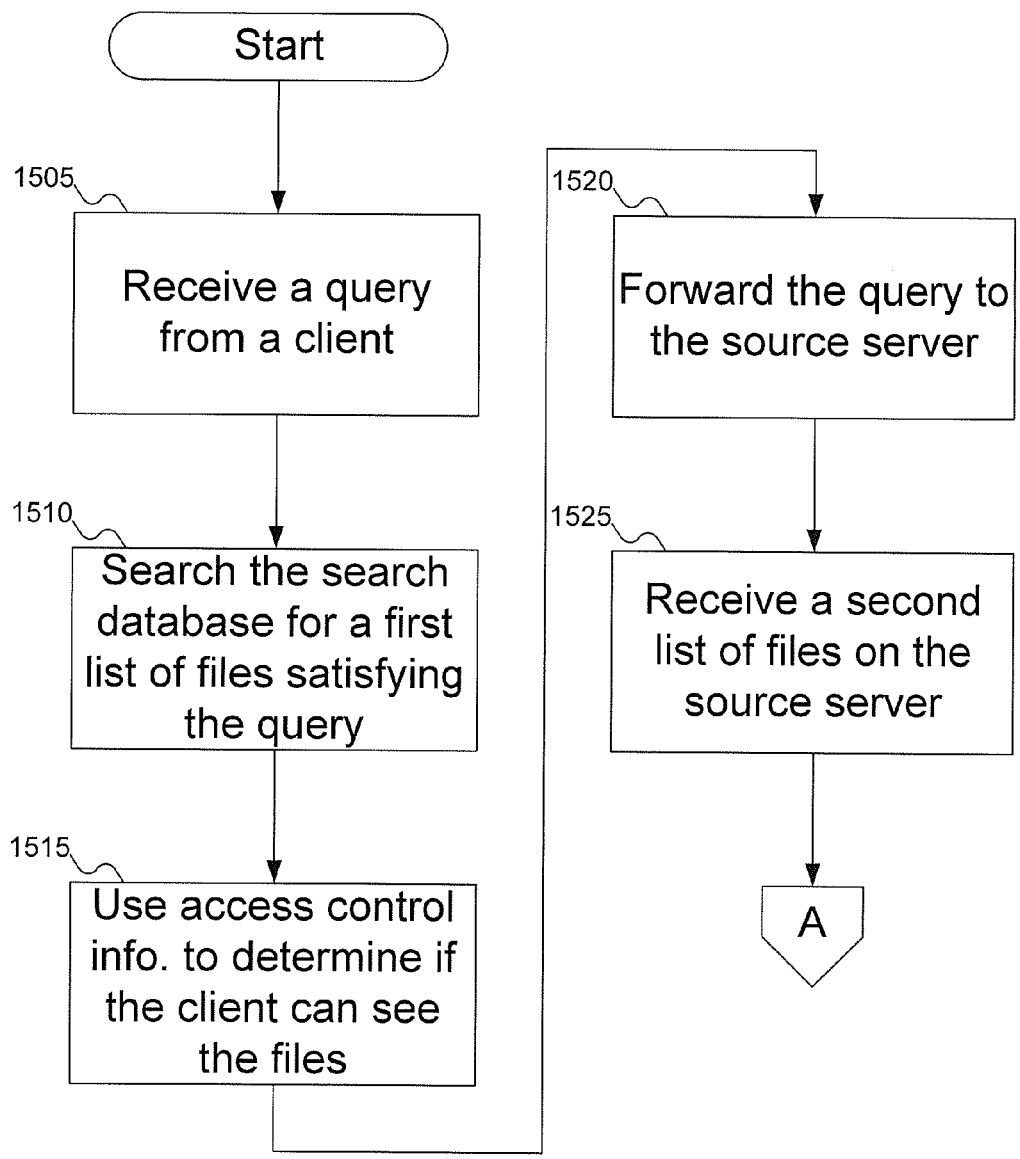
FIGS. 15A-15C show a flowchart of the procedure for responding to a query from a client by the time domain server of FIG. 10, according to an embodiment of the invention.
Figure 15B:
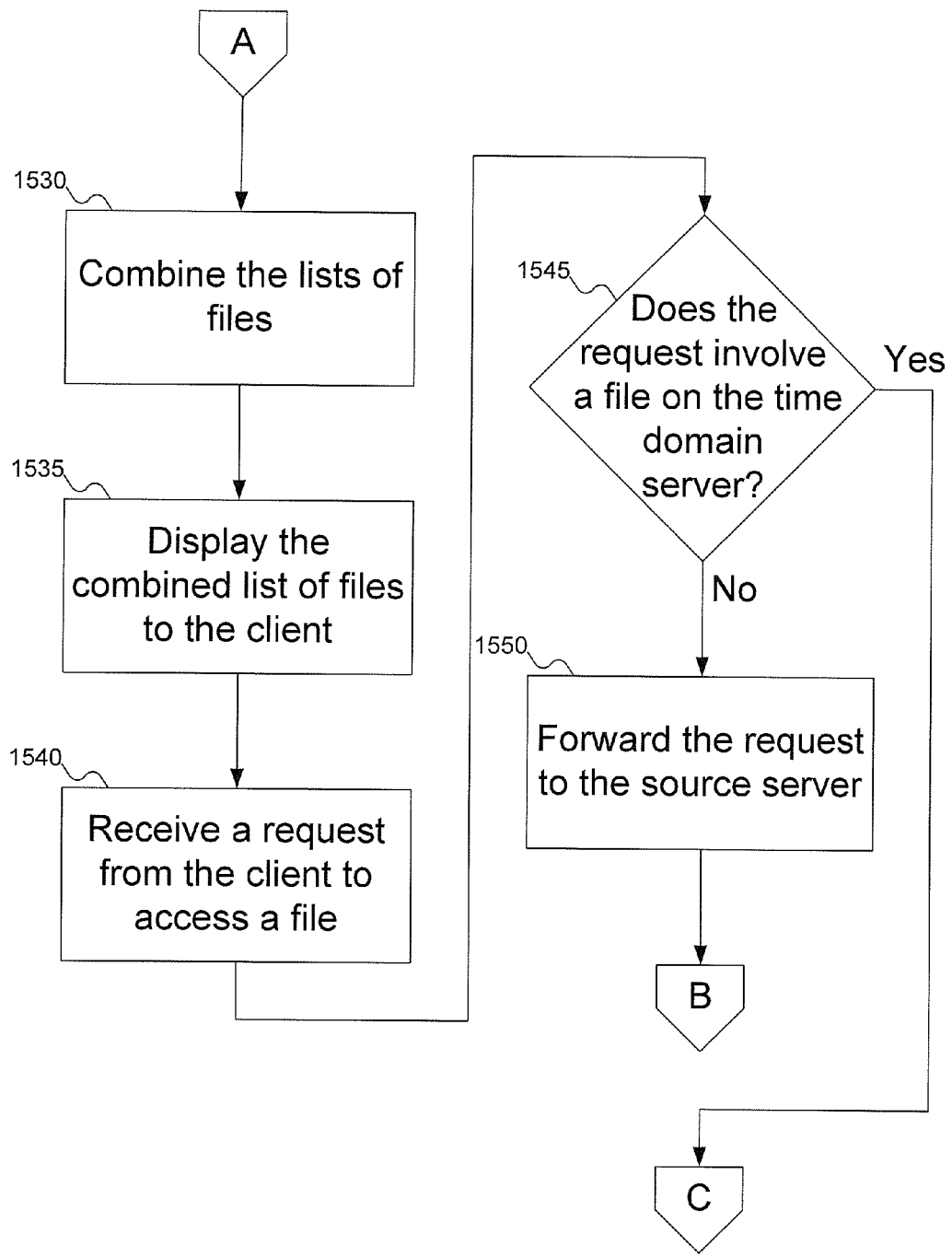
Figure 15C:
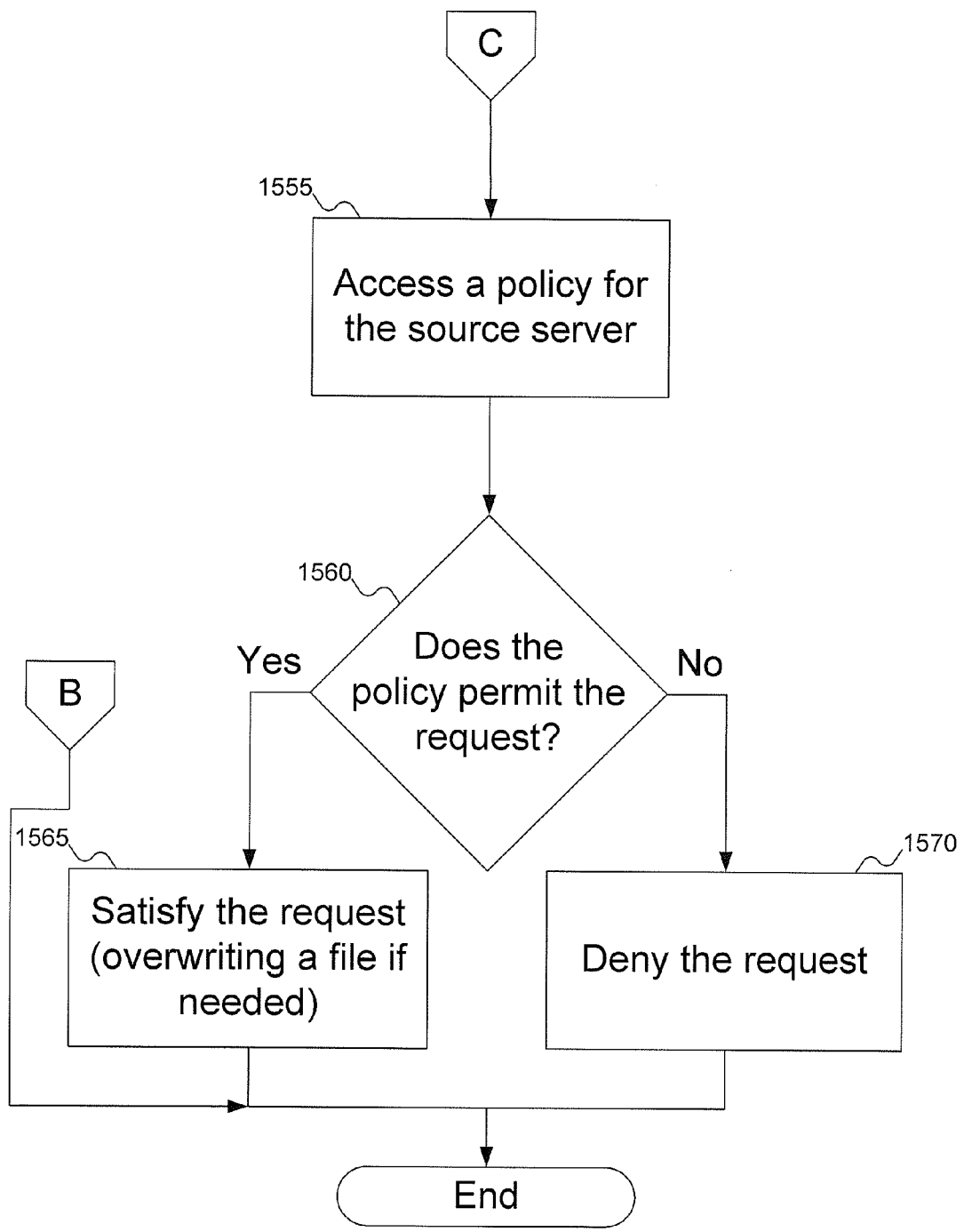

FIGS. 15A-15C show a flowchart of the procedure for responding to a query from a client by the time domain server of FIG. 10, according to an embodiment of the invention. At step 1505, the time domain server receives a query from a client. At step 1510, the query is passed to the search database manager, to search the database of the volume and satisfy the query. At step 1515, the time domain server uses access control information for the files found by the search database manager to limit the result to files the client can access. At step 1520, the query is forwarded to the source server, and at step 1525 the time domain server receives a list of files from the source server satisfying the query.

At step 1530 (FIG. 15B) the lists of files returned from the search database manager and the source server are combined. At step 1535, the combined list of files is presented to the client. At step 1540, the time domain server receives a request from the client to access a file. At step 1545, the time domain server determines if the request involves a file in the source server version storage. If not, then at step 1550, the time domain server passes the request to the source server, and processing is complete.

If the request involves a file in the source server version storage, then at step 1555 (FIG. 15C) the time domain server accesses a policy governing the source server. At step 1560, the time domain server determines if the policy permits the request. If the policy permits the request, then at step 1565 the time domain server performs the request (which may involve overwriting a file: e.g., if the client requests an older version of the file replace the version of the file on the source server). Otherwise, at step 1570 the time domain server denies the request.

A person skilled in the art will recognize that an embodiment of the invention described above may be implemented using a suitably programmed computer. In that case, the method is embodied as instructions that comprise a program (in this case, instructing a central processing unit how to execute other programs). The program may be stored on computer-readable media, such as floppy disks, optical disks (such as compact discs), fixed disks (such as hard drives), random access memory (RAM), read-only memory (ROM), or flash memory. The program may then be executed on a computer to implement the method. A person skilled in the art will also recognize that an embodiment of the invention described above may include a computer-readable modulated carrier signal, and that the program, or portions of its execution, may be distributed over multiple computers in a network.

Having illustrated and described the principles of the invention in an embodiment thereof, it should be readily apparent to those skilled in the art that the invention may be modified in arrangement and detail without departing from such principles. All modifications coming within the spirit and scope of the accompanying claims are claimed.

The invention claimed is:

1. A computer-implemented method for using an event system, comprising:
   receiving a start epoch declaration at an event request handler from a computer operated by a consumer;
   beginning an epoch for the consumer at a time of receiving the start epoch declaration, including assigning a unique epoch number to the epoch for the consumer;
   receiving a first event;
   associating the first event with the first epoch in an event list;
   ending the epoch for the consumer at a time of receiving an end epoch declaration at the event request handler from the consumer; and
   reading an event associated with the first epoch from the event list after ending the first epoch and sending the associated event to the computer operated by the consumer.

2. A computer-implemented method according to claim 1, wherein the start epoch declaration comprises a first start epoch declaration, the consumer comprises a first consumer, the epoch comprises a first epoch, and the end epoch declaration comprises a first end epoch declaration, the method further comprising:
   receiving a second start epoch declaration at the event request handler from a second computer operated by a second consumer;
   beginning a second epoch for the second consumer at a time of receiving the second start epoch declaration, and without receiving the first end epoch declaration for the first epoch;
   ending the second epoch at a time of receiving a second end epoch declaration at the event request handler from the second consumer; and
   reading a second event associated with the second epoch from the event list after ending the second epoch and sending the second associated event to the second computer operated by the second consumer.

3. An apparatus for using an event system, the apparatus comprising:
   an epoch storage configured to store at least one first active epoch and a second active epoch;
   the first active epoch created by a first start epoch declaration and remaining active until a first end epoch declaration;
   the second active epoch created by a second start epoch declaration and remaining active until a second end epoch declaration;
   an event storage;
   an event list manager to receive an event, store the event in the event storage, and associate the event with at least one epoch active when the event occurred;
   an event request handler to receive the first start epoch declaration, the first end epoch declaration, the second start epoch declaration, and the second end epoch declaration; and
   an interface with the event list manager, wherein after a user issues at least one of the first and second end epoch declarations, the interface enables the user to access the event that was associated with the corresponding active epoch while the epoch was active;
   wherein the first start epoch declaration is issued at a time of the start of the first active epoch and the first end epoch declaration is issued at a time of the end of the first active epoch.

4. An apparatus according to claim 3, wherein the second start epoch declaration is issued at a time of the start of the second active epoch and the second end epoch declaration is issued at a time of the end of the second active epoch.

5. An apparatus according to claim 3, further comprising:
   a volume;
   a file system for the volume, configured to report the event; and
   the event list manager is configured to associate a unique epoch number for each epoch active when the event occurred with the event in the event storage.

6. An apparatus according to claim 5, wherein the event list manager is configured to associate the event with at least the first active epoch in the epoch storage if the first active epoch is active when the event occurs and to associate the event with the second active epoch if the second active epoch is active when the event occurs.

7. An apparatus according to claim 6, wherein the event is associated with the unique epoch numbers for at least the first active epoch or the second active epoch.

8. An apparatus according to claim 5, wherein the event list manager is configured to assign a unique epoch number to at least one of the first and second active epochs thereby giving a user an impression of being a sole consumer of events.

9. An apparatus according to claim 3, wherein the interface enables the user to issue one of the start epoch declarations without issuing any end epoch declaration.

10. A computer-implemented method for using an event system, comprising:
    receiving a first start epoch declaration from a first computer operated by a first consumer;
    beginning a first epoch for the first consumer at a time of receiving the first start epoch declaration;
    receiving a second start epoch declaration from a second computer operated by a second consumer;
    beginning a second epoch for the second consumer at a time of receiving the second start epoch declaration, and without receiving an end epoch declaration;
    maintaining the first epoch as active until receiving an end epoch declaration from the first consumer;
    maintaining the second epoch as active until receiving an end epoch declaration from the second consumer;
    receiving a first event;
    storing the first event in an event list;
    associating the first event with any active epochs in the event list;
    ending the first epoch at a time of receiving the end epoch declaration from the first consumer;
    reading an event associated with the first epoch from the event list after ending the first epoch; and
    sending the associated event to the first computer operated by the first consumer.

11. A computer-implemented method according to claim 10, wherein:
    receiving a first event includes receiving the first event from a file system as the first event occurs; and
    associating the first event with any active epochs in the event list includes:
      associating the first event with the first epoch if the first epoch is active when the first event occurs; and
      associating the first event with the second epoch if the second epoch is active when the first event occurs.

12. A computer-implemented method according to claim 11, further comprising:
    receiving a second event as the second event occurs, wherein the second event is a different event type than the first event;

associating the second event with the first epoch if the first epoch is active when the second event occurs; and
associating the second event with the second epoch if the second epoch is active when the second event occurs.

13. A computer-implemented method according to claim 10, wherein receiving the first start epoch declaration includes receiving the first start epoch declaration from the first consumer using non-proprietary application program interfaces (APIs).

14. A computer-implemented method according to claim 10, wherein receiving the second start epoch declaration includes receiving the second start epoch declaration from the second consumer using non-proprietary application program interfaces (APIs).

15. A computer-implemented method according to claim 10, wherein:
beginning the first epoch includes beginning the first epoch for the first consumer at a first time; and
beginning the second epoch includes beginning the second epoch for the second consumer at a second time.

16. A computer-implemented method according to claim 15, wherein:
ending the first active epoch includes ending the first active epoch for the first consumer at a third time; and
ending the second active epoch includes ending the second active epoch for the second consumer at a fourth time.

17. A computer-implemented method according to claim 10, wherein:
receiving the first event includes receiving the first event from the file system for a volume; and
storing the first event includes storing the first event in the event list on the volume.

18. A computer-implemented method according to claim 10, wherein storing the first event includes storing the first event in the event list implemented as a b-tree.

19. A computer-implemented method according to claim 10, wherein reading an event associated with the first epoch from the event list includes removing the association of the event with the first epoch.

20. A computer-implemented method according to claim 19, wherein removing the association of the event with the first epoch includes removing the event from the event list if the event is not associated with the second epoch.

21. A computer-implemented method according to claim 19, wherein removing the association of the event with the first epoch includes removing the event responsive to a message from the first consumer that the event can be removed.

22. A computer-implemented method according to claim 10, wherein reading an event associated with the first epoch includes reading the associated event from the event list using non-proprietary application program interfaces (APIs).

23. A computer-implemented method according to claim 10, further comprising processing the associated event associated with the first epoch by the first consumer.

24. A computer-implemented method according to claim 10, wherein:
the method further comprises receiving a request for the associated event associated with the first epoch from the first consumer; and
reading an event associated with the first epoch and sending the associated event associated with the first epoch are responsive to the request for the associated event.

25. A computer-implemented method according to claim 10, wherein storing the first event includes:
determining that the first event affects an object of the file system and that a second event affects the object of the file system, wherein the first event and the second event are different events;
determining that the first event and the second event are compressible; and
compressing the first event and the second event.

26. A computer-implemented method according to claim 25, wherein the object is one of a file, a directory, and the volume.

27. A computer-implemented method according to claim 25, wherein determining that the first event and the second event are compressible includes:
determining that the first epoch was active when the first event occurred; and
determining that the second event is associated with the first active epoch.

28. A computer-implemented method according to claim 25, wherein compressing the first event and the second event includes discarding the first event.

29. A computer-implemented method according to claim 25, wherein compressing the first event and the second event further includes storing additional information about the first event with the first epoch associated with the second event before discarding the first event.

30. A computer-implemented method according to claim 10, further comprising:
receiving a third start epoch declaration from the first consumer;
beginning a third epoch for the first consumer; and
maintaining the third epoch as active until receiving a third end epoch declaration from the first consumer.

31. A computer-implemented method according to claim 30, wherein receiving the first end epoch declaration from the first consumer includes receiving the first end epoch declaration before receiving the third start epoch declaration from the first consumer.

32. A computer-implemented method according to claim 30, wherein reading an event associated with the first epoch includes reading the event associated with the first epoch after beginning the third epoch for the first consumer.

33. A computer-implemented method according to claim 10, further comprising removing the association of the event with the first epoch.

34. A computer-implemented method according to claim 10, wherein ending the first epoch includes changing a state of the first epoch to in-use after ending the first epoch.

35. A computer-implemented method according to claim 10, further comprising changing a state of the first epoch to a not-in-use status if no events are associated with the first epoch.

36. An apparatus for using an event system, the apparatus comprising:
a volume;
a file system for the volume, configured to report an event as the event occurs;
an event storage;
an epoch storage configured to store a first active epoch and a second active epoch, the first active epoch created by a first start epoch declaration and remaining active until a first end epoch declaration, the second active epoch created by a second start epoch declaration and remaining active until a second end epoch declaration;
an event list manager configured to receive the event from the file system, store the event in the event storage, associate the event with the first active epoch in the epoch storage if the first active epoch is active when the event occurs, and associate the event with the second active epoch if the second active epoch is active when the event occurs; and an interface with the event list manager, wherein after a user issues at least one of the first and second end epoch declarations, the interface enables the user to access the event that was associated with the corresponding active epoch while the epoch was active, wherein a state of the first epoch is changed to in-use and maintained in the epoch storage responsive to the first end epoch declaration, and wherein a state of the second epoch is changed to in-use and maintained in the epoch storage responsive to the second end epoch declaration.

37. An article drawn from the set including floppy disks, optical disks, fixed disks, random access memory, read-only memory, or flash memory, comprising a machine-accessible medium having associated instructions that, when executed, results in a machine:

receiving a first start epoch declaration from a first computer operated by a first consumer;

beginning a first epoch for the first consumer at a time of receiving the first start epoch declaration;

receiving a second start epoch declaration from a second computer operated by a second consumer;

beginning a second epoch for the second consumer at a time of receiving the second start epoch declaration, and without receiving an end epoch declaration;

maintaining the first epoch as active until receiving an end epoch declaration from the first consumer;

maintaining the second epoch as active until receiving an end epoch declaration from the second consumer;

receiving a first event;

storing the first event in an event list;

associating the first event with any active epochs in the event list;

ending the first epoch at a time of receiving the end epoch declaration from the first consumer;

changing a state of the first epoch to in-use after ending the first epoch;

ending the second epoch at a time of receiving the end epoch declaration from the second consumer;

reading an event associated with the first epoch from the event list after ending the first epoch; and sending the associated event to the first computer operated by the first consumer.

38. An article according to claim 37, wherein:

receiving a first event includes receiving the first event from a file system as the first event occurs; and receiving a second event includes receiving the second event from the file system as the second event occurs.

39. An article according to claim 38, the machine-accessible medium having further associated data that, when accessed, result in the machine removing the association of the first event with the first epoch.

* * * * *